United States Patent [19]
Thompson et al.

[11] Patent Number: 5,242,644
[45] Date of Patent: Sep. 7, 1993

[54] PROCESS FOR MAKING CAPILLARY CHANNEL STRUCTURES AND EXTRUSION DIE FOR USE THEREIN

[75] Inventors: Hugh A. Thompson, Fairfield; Edward H. Krautóter, Cincinnati, both of Ohio

[73] Assignee: The Procter & Gamble Company, Cincinnati, Ohio

[21] Appl. No.: 964,593

[22] Filed: Oct. 21, 1992

Related U.S. Application Data

[60] Division of Ser. No. 773,164, Oct. 8, 1991, Pat. No. 5,200,248, which is a continuation-in-part of Ser. No. 482,446, Feb. 20, 1990, abandoned.

[51] Int. Cl.$^5$ ............................................. B29C 47/20
[52] U.S. Cl. ............................... 264/177.15; 264/563; 264/209.5; 425/72.2; 425/326.1; 425/464; 425/467
[58] Field of Search ..................... 264/177.1–177.2, 264/209.3–209.8, 210.2–210.3, 561, 563, 564; 425/380, 464, 467, 72.2, 378.2, 326.1

[56] References Cited

U.S. PATENT DOCUMENTS

| Re. 32,741 | 8/1988 | Miyoshi et al. | 528/295 |
|---|---|---|---|
| 2,000,388 | 5/1935 | Hofstadt | 264/177.1 |
| 2,687,997 | 8/1954 | Marchand | 264/177.14 |
| 3,075,242 | 1/1963 | Grafried | 425/467 |
| 3,095,258 | 6/1963 | Scott | 18/54 |
| 3,121,040 | 2/1964 | Shaw et al. | 161/177 |
| 3,156,607 | 11/1964 | Strachan | 161/177 |
| 3,194,002 | 7/1965 | Raynolds et al. | 57/140 |
| 3,272,901 | 9/1966 | Sims | 264/177 |
| 3,295,308 | 1/1967 | Abernathy et al. | 428/397 |
| 3,340,571 | 9/1967 | Bishop et al. | 18/8 |
| 3,346,916 | 10/1967 | Elbert et al. | 425/464 |
| 3,383,276 | 5/1968 | Gould | 161/177 |
| 3,388,198 | 6/1968 | Sims | 264/177 |
| 3,508,390 | 4/1970 | Bagnall et al. | 57/140 |
| 3,538,208 | 11/1970 | Ohtsuka | 264/89 |
| 3,608,042 | 9/1971 | Rasmussen | 264/177.19 |
| 3,613,778 | 10/1971 | Feldman, Jr. | 165/105 |
| 3,633,538 | 1/1972 | Hoeflin | 118/76 |
| 3,700,545 | 11/1974 | Matsui et al. | 161/175 |
| 3,914,365 | 10/1975 | Kim et al. | 264/147 |
| 3,929,135 | 12/1975 | Thompson | 128/287 |
| 3,933,965 | 1/1976 | Gallone et al. | 264/151 |
| 3,948,273 | 4/1976 | Sanders | 128/351 |
| 3,971,435 | 7/1976 | Peck | 165/78 |

(List continued on next page.)

FOREIGN PATENT DOCUMENTS

| 0233702 | 8/1987 | European Pat. Off. |
| 88306987.4 | 2/1989 | European Pat. Off. |
| 391814A2 | 10/1990 | European Pat. Off. |
| 11746 | 7/1956 | Fed. Rep. of Germany |
| 19034 | 5/1960 | Fed. Rep. of Germany |
| 22607 | 1/1962 | Fed. Rep. of Germany |

(List continued on next page.)

OTHER PUBLICATIONS

Encyclopedia of Polymer Science and Engineering, vol. 6, pp. 802–839 (1986).
Encyclopedia of Polymer Science and Technology, Second Edition, vol. 6, pp. 767–769.

(List continued on next page.)

*Primary Examiner*—Jeffery Thurlow
*Attorney, Agent, or Firm*—Kevin C. Johnson; Thomas H. O'Flaherty; Jerry J. Yetter

[57] ABSTRACT

A process and extrusion die for making capillary channel structures having one or more intrastructure capillary channels. The process includes feeding a flowable, molten polymer composition through an extrusion die having an annular base orifice from which a plurality of capillary channel wall orifices radially extend. The extrusion die has a gas inlet port located interior to the annular base orifice. Simultaneous with feeding the polymer composition through the extrusion die's annular base and capillary channel wall orifices a gaseous stream is directed through the gas inlet port in the same direction as the flow of molten polymer composition. Subsequent to exit of the polymer composition from the extrusion die, the capillary channel structure is drawn to a desired size and cooled.

4 Claims, 13 Drawing Sheets

U.S. PATENT DOCUMENTS

| | | | |
|---|---|---|---|
| 4,001,366 | 1/1977 | Brumlik | 264/177.1 |
| 4,046,190 | 9/1977 | Marcus et al. | 165/105 |
| 4,054,709 | 10/1977 | Belitsin et al. | 428/224 |
| 4,076,121 | 2/1978 | Clayton et al. | 206/390 |
| 4,101,620 | 7/1978 | Kops et al. | 264/177 |
| 4,179,259 | 12/1979 | Belitsin et al. | 425/461 |
| 4,212,347 | 7/1980 | Eastman | 165/46 |
| 4,256,111 | 3/1981 | Lassen | 128/284 |
| 4,286,005 | 8/1981 | Berger | 428/167 |
| 4,322,737 | 3/1982 | Sliwa, Jr. | 357/82 |
| 4,336,307 | 6/1982 | Shiozaki et al. | 264/561 |
| 4,342,314 | 8/1982 | Radel et al. | 128/287 |
| 4,364,998 | 12/1982 | Wei | 428/399 |
| 4,381,325 | 4/1983 | Masuda et al. | 428/91 |
| 4,405,686 | 9/1983 | Kuroda et al. | 428/374 |
| 4,450,472 | 5/1984 | Tuckerman et al. | 357/82 |
| 4,455,347 | 6/1984 | Ochi et al. | 428/369 |
| 4,485,058 | 11/1984 | Suzuki et al. | 264/177.14 |
| 4,489,777 | 12/1984 | Del Bagno et al. | 165/104.26 |
| 4,492,731 | 1/1985 | Bankar et al. | 428/362 |
| 4,521,364 | 6/1985 | Norota et al. | 264/176 |
| 4,622,054 | 11/1986 | Huey et al. | 65/2 |
| 4,623,329 | 11/1986 | Drobish et al. | 604/29 |
| 4,634,625 | 1/1987 | Franklin | 428/258 |
| 4,636,234 | 1/1987 | Huey et al. | 65/2 |
| 4,668,566 | 5/1987 | Braun | 428/286 |
| 4,707,407 | 11/1987 | Clark et al. | 428/361 |
| 4,707,409 | 11/1987 | Phillips | 428/397 |
| 4,710,185 | 12/1987 | Sneyd, Jr. et al. | 604/372 |
| 4,713,289 | 12/1987 | Shiffler | 428/361 |
| 4,812,361 | 3/1989 | Takemoto et al. | 428/397 |
| 4,814,131 | 3/1989 | Atlas | 264/147 |
| 4,842,792 | 6/1989 | Bagrodia et al. | 264/130 |
| 5,011,642 | 4/1991 | Welygan et al. | 264/177.19 |
| 5,057,368 | 10/1991 | Largman et al. | 428/397 |
| 5,063,009 | 11/1991 | Mizutani et al. | 264/177.14 |

FOREIGN PATENT DOCUMENTS

| | | |
|---|---|---|
| 22720 | 2/1962 | Fed. Rep. of Germany . |
| 23616 | 8/1962 | Fed. Rep. of Germany . |
| 955625 | 1/1950 | France . |
| 2095043 | 2/1972 | France . |
| 50-23149 | 2/1975 | Japan . |
| 50-52287 | 4/1975 | Japan . |
| 151617 | 11/1979 | Japan . |
| 710087 | 6/1954 | United Kingdom . |
| 1488676 | 10/1977 | United Kingdom . |
| 2152871A | 8/1985 | United Kingdom . |

OTHER PUBLICATIONS

Encyclopedia of Polymer Science and Engineering, Second Edition, vol. 4, pp. 815–831.

Encyclopedia of Polymer Science and Engineering, Second Edition, vol. 7, pp. 107–109.

DuPont Sales Pamphlet Titled "CoolMax ™", #-86135.

"The Fundamentals of Fiber Formation", Andrzej Ziabicki, Wiley-Interscience Publication (New York, 1976), pp. 360–366.

Anthony M. Schwartz, "Capillarity-Theory and Practice", Chemistry and Physics of Interfaces-II, American Chemical Society Symposium, 1971.

Stanley M. Suchecki, "Toward a More Comfortable Polyester", Textile Industries Apr. 1977, pp. 74–82 and 121–122.

"On Fiber Formation in Melt Spinning (Part I)", V. Grobe and H. Versaumer, Faserforsch and Textiltech, 14,249 (1963).

"The Development and Testing of Synthetic-Fiber-Prefiling, With and Without Hollow Spaces", H. Bohringer and F. Bolland, Faserforsch and Textiltech (1958).

"Synthetic Fibrous Materials with Profiled Cross Section", H. Bohringer and F. Bolland, Mellian Textilber, 36,677 (1955).

"Flat-Plate Heat Pipe", George L. Fleischman and Bruce D. Marcus, NASA Tech Briefs, Spring 1978, p. 43.

"Anatomy of a New Fiber Type," based on a lecture by Dr. Peter Hoffmann, published in Textile Month, Jan. 1977, pp. 26–29.

."Man-Made Fibers-Science and Technology", H. F. Mark, et al., vol. I, pp. 227–231, Interscience Publishers, John Wiley & Sones, Inc., 1967.

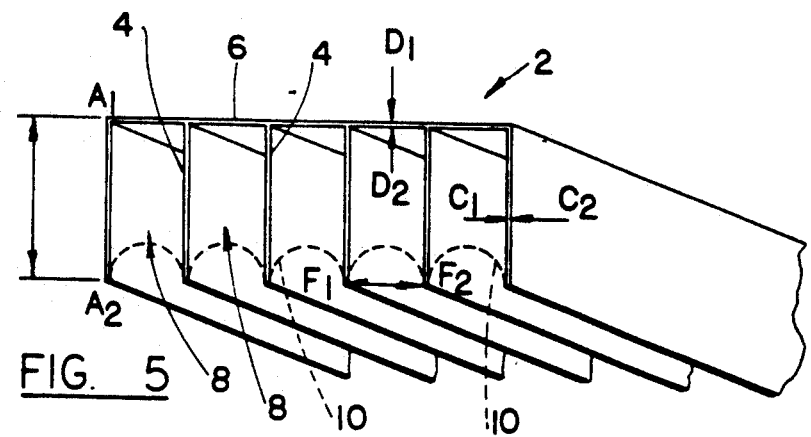
FIG. 5
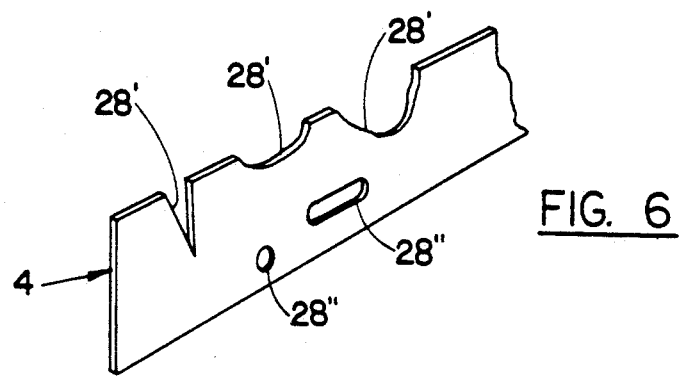
FIG. 6
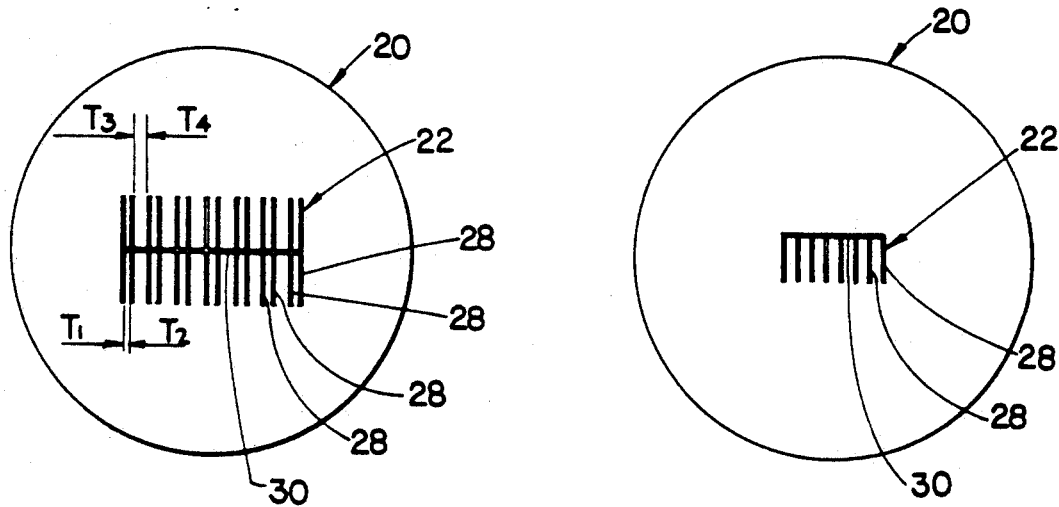
FIG. 8
FIG. 7

PROCESS FOR MAKING CAPILLARY CHANNEL STRUCTURES AND EXTRUSION DIE FOR USE THEREIN

CROSS-REFERENCE TO RELATED APPLICATION

This application is a division of co-pending application Ser. No. 07/773,164, filed on Oct. 8, 1991, now U.S. Pat. No. 5,200,248 and a continuation-in-part of the co-pending application having U.S. Ser. No. 07/482,446, filed Feb. 20, 1990 now abandoned in the names of Hugh Ansley Thompson and Edward Herman Krautter.

FIELD OF INVENTION

This invention pertains generally to the field of absorbent structures and, more particularly, to the field of man-made capillary channel structures having an intrastructural capability to absorb and transport fluids. This invention further relates to processes for making such capillary channel structures.

BACKGROUND

The manufacture and use of man-made fibers for use in woven and nonwoven textiles and in absorbent webs in disposable products, e.g., diapers, catamenials, etc., has been known for some time. Good absorbency and wicking properties are generally desirable attributes in such products. In absorbent webs, the desirability for high absorbency and wicking performance is apparent in that it is the primary purpose of such webs to absorb deposited fluids. It is often equally essential that the webs have the capacity to wick the fluids away from the region of deposit in order to prevent failure at such deposit region, and in order to more fully utilize the absorbent capacity of the web. In textile materials, worn as clothing, it is often desirable to wick perspiration away from the skin in order to facilitate evaporation of the perspiration and to prevent a "clammy" sensation of the skin.

Conventionally, absorbent webs have been made from natural cellulosic fibers. Absorbency in such webs was achieved by a combination of fluid penetration into the interior of the cellulosic fiber lumen and retention in interfiber capillary spaces. Wicking was primarily achieved through the action of such interfiber capillary spaces. More recently, many absorbent webs for disposable absorbent products, especially diapers, have been supplemented with polymeric gelling agents which absorb fluids to form an insoluble gel. The use of such polymeric gelling agents has facilitated the design of thin, low bulk diapers. However, the usage of such polymeric gelling agents has also increased the importance of the wicking performance of the fibers since a significant portion of the absorbency function of the fibers is performed by the polymeric gelling agents. However, due to limitations of fluid distribution properties of fibrous webs conventionally used to acquire and distribute discharged body fluids, substantial portions of the fibers, the polymeric gelling material, or other absorbent materials, are often not efficiently utilized. In particular, large areas of the web that are not proximate to the region of fluid discharge remain often unused, or not efficiently utilized, even when other regions of the web proximate to the region of fluid discharge may become oversaturated to the point of failure (i.e., leakage). Thus, it is highly desirable to provide fibrous materials that provide improved wicking performance relative to conventionally used fibers and webs, that are additionally economically viable, and that can efficiently transport fluid in a low bulk absorbent article design.

A significant drawback of conventional fibers is that their ability to wick fluids is highly dependent upon the bulk density of the web into which they are formed. In addition to the established trade-offs relating to interfiber capillary size, wicking rate, and volumetric flow rate, another factor which must be considered when choosing design parameters is tactile softness of the web being formed. In general, softness will decrease as bulk density and interfiber capillarity are increased. Thus, aesthetic and structural design considerations must often be compromised to attain desired absorbency and wicking performance in the design of absorbent products. These same considerations and drawbacks are additionally applicable to webs made of conventional synthetic fibers, such as nylon, polyester, polypropylene, and chemical cellulose-based fibers.

One technique that has been used to increase wicking performance of fibrous webs is to hydrophilize the fibers. Although such treatments are effective for increasing wicking ability, they do not increase fluid distribution properties of the fibers such that significantly larger amounts of fluid can be efficiently transported to regions of absorbent articles distant from the region of fluid discharge. Hydrophilization treatments additionally do not affect the trade-offs conventionally experienced regarding poor capillarity for soft, low density webs.

Another approach that has been investigated is to form fibers having intrafiber capillary channels. These fibers have the ability to wick fluids individually, without necessarily relying upon the close proximity of adjacent fibers to form interfiber capillary pathways. A variety of fibers with grooves or intra-fiber channels have been proposed. Though by no means intended to represent a comprehensive review of the art, it is believed that the following references at least are indicative of the published art.

French Patent 955,625, Paul Chevalier, "Improvements in Spinning Artificial Fiber", published Jan. 16, 1950, discloses fibers of synthetic origin with allegedly improved capillarity. The fibers are said to have continuous or discontinuous grooves positioned in the longitudinal direction, i.e., parallel to the fiber axis. The fibers may have a central nucleus from which radiate radial leaves. This patent also discloses a process for making the fibers involving a first spinneret for forming the fibers into the desired shape and a second spinneret in direct communication with the first, separated from the first by an insulating plate, for cooling the fiber. The second spinneret is in contact with a cooling element.

U.S. Pat. No. 3,121,040, Gilbert Shaw, "Unoriented Polyolefin Filaments", issued Feb. 11, 1964, discloses a variety of plastic filaments, and a process for making them, which assertedly exhibit good recovery after deformation and resisting orientation (i.e., matting) upon use in such applications as paint brushes. These objects are said to be achieved by preparing fibers having cross-sections consisting of interconnected webs with web length, web thickness, and radius of particular, specified requirements.

U.S. Pat. No. 4,054,709, M. N. Belitsin, et al., "Man-Made Fibre, Yarn and Textile Produced Therefrom", issued Oct. 18, 1977, discloses fibers of polycaproamide and polyethylene terephthalate displaying a cross sectional shape formed of at least two elements formed of intersecting rays which define open capillary channels and a bridge interconnecting particular rays of the elements. The rays intersect at angles of from 10° to 70° to form the capillary channels. The fibers are said to exhibit an appearance and moisture conductivity and absorption approaching natural silk.

U.S. Pat. No. 4,381,325, Utaka Masuda, et al., "Liquid Retaining Synthetic Fiber, Process for Producing the Same, and Products", issued Apr. 26, 1983 discloses a liquid-retaining synthetic fiber having a substantially pointed free end and a tapered portion. The fibers disclosed include embodiments having a plurality of channels running along the axial length of the fibers.

European Patent Application 883 069 87.4, publication number 0,301,874, published Feb. 1, 1989, Andrew G. Wilkes and Alan J. Bartholomew, "Cellulosic Fibre", discloses viscose filaments having multi-limbed cross-section, e.g., Y-, X-, H-, and T- shapes which are said to be useful for absorbent products and woven and nonwoven fabrics.

U.S. Pat. No. 4,286,005, Richard M. Berger, "Ink Reservoir Element for Use in a Marking Instrument, and Method and Apparatus for Producing Same", issued Aug. 25, 1981, discloses an ink reservoir element formed from a coherent sheet of flexible thermoplastic fibrous material or form-attenuated extruded polyester fabric, which has been uniformly embossed with a series of parallel grooves. The embossed sheet is compacted and bonded into a dimensionally stable body whose longitudinal axis extends parallel to the embossed grooves.

U.S. Pat. No. 4,623,329, James L. Drobish, et al., "Drainage and Infusion Catheters Having a Capillary Sleeve Forming a Reservoir for a Fluid Antimicrobial Agent", issued Nov. 18, 1986, discloses catheter tubs provided at the inner surfaces with longitudinally extending capillary channels or grooves. The grooves preferably exhibit a favorable surface contact angle for the particular fluid to be dispensed. Surface treatments to alter the surface contact angle can be applied.

Japanese Patent Application 151617-1979, published Nov. 29, 1979, Teijin KK, "Synthetic Fibers", discloses various modified-profile synthetic fibers, especially of polyester or polyamide, having a cross-section shape characterized by fine pores running in the axial direction having diameter of 0.01 microns to 5 microns and a total cross-sectional area of the pores of 0.016 to 50% of the total cross-sectional area of the fibers. The fibers can have additives for increasing water absorption properties.

European Patent Application EP-A-391814, published Oct. 10, 1990, Eastman Kodak Company, "Fibers Capable of Spontaneously Transporting Fluids," discloses fibers which are said to be especially effective at transporting fluids such as water on their surfaces. Such fibers are defined by a mathematical relationship between the contact angle of fluid to be transported by the fibers and a "shape factor" which is determined by the geometric configuration of a cross-section of the fiber.

In spite of these advances, it remains desirable to provide flexible, collapse-resistant, capillary channel structures that exhibit further improved intrafiber absorbent capacity and wicking ability. It is an object of this invention to provide such structures which additionally can be produced and utilized with improved economics relative to those previously shown in the arts. More specifically, it is an object of this invention to provide such structures which exhibit improved absorptive capacity on a unit weight basis in combination with high capillary suction (i.e., high height of rise of fluid against gravity) which also resist collapse of the capillary channels during handling and use.

It is another object of this invention to provide structures as described immediately above which are in the form of fibers, and which can be used for woven and nonwoven textile materials or in the form of webs or bundles, such as in absorbent articles (e.g., diapers, catamenials, etc.).

It is yet another object of this invention to provide such capillary channel structures in the form of a flexible sheet or film.

It is still another object to provide absorbent articles, including disposable absorbent articles, incorporating such capillary channel fibers as an element thereof.

It is another object of this invention to provide flexible, collapse-resistant capillary channel structures which are especially suited for transporting and/or storing aqueous fluids.

It is still another object to provide flexible, collapse-resistant capillary channel structures which are especially suited for transported and/or storing organic fluids, e.g., oil.

It is yet another object to provide a process for making improved capillary channel structures which can meet the above objects.

It is yet a further object to provide equipment which facilitates the manufacture of such improved capillary channel structures which can be utilized in conjunction with the above-reference process.

These objects and still other benefits and uses of the present invention can be attained in the manner described hereafter.

SUMMARY OF THE INVENTION

In general, this invention provides collapse-resistant, capillary channel structures comprising a polymer composition and having at least one intrastructure capillary channel, wherein the structures have an axial base and at least two walls extending from the base, typically (but not necessarily) along substantially the entire length of the base element, whereby the base element and walls define said capillary channel(s). Although the capillary channel structures hereof may have one capillary channel or a plurality of capillary channels, for convenience the plural form "channels" is used with the intent that it shall refer to a singular "channel" in structures that can have either one such channel or a plurality of channels as structures having more than one channel. The structures are further characterized in that the cross-section of the capillary channels is open along a substantial length of the structure in the axial direction of the channels such that fluid can be received from outside of such channels. In general, the structures will typically have Specific Capillary Volume (SCV) of at least about 2.0 cc/g, preferably at least about 2.5 cc/g, more preferably, at least about 4.0 cc/g, and a Specific Capillary Surface Area (SCSA) of at least about 2000 $cm^2/g$, preferably at least about 3000 $cm^2/g$, more preferably at least about 4000 $cm^2/g$. These values are believed to be significantly higher than the corresponding combination of values for conventional fibrous materials and previously disclosed capillary channel structures, and are indicative of the improved fluid capacity and the improved capability to transport and store fluid on a weight basis that characterize the structures of the present invention.

In general, SCV is a measure of the volumetric fluid capacity of the absorbent structure on a unit weight basis, and is therefore indicative of the economic efficiency of the absorbent structure. However, in order for a structure with high SCV to also have high capillary suction (i.e., have excellent ability to wick fluids at a substantial volumetric rate (on a unit weight basis of the structure), via intra-structure capillary transport), the design of the structure must provide for a relatively high degree of capillary channel surface area contact between the material of the solid structure and the liquid which is to be transported. This is because capillary suction (alternately, "hydrostatic tension") is in part dependent upon the amount of interfacial contact area between the solid structure and fluid. The SCSA is a measure of the surface area, per unit weight of the structure, of the capillary channels in the structures hereof available for contact with fluids. The combination of required SCV and SCSA as set forth herein is met by providing capillary channel structures with efficient capillary channel design and, importantly, with relatively thin capillary channel walls and/or channel bases.

As described above, the capillary channel structures of the present invention are characterized by having relatively thin walls and bases compared to the width of the capillary channels. However, in order to provide capillary channels of sufficient SCV, the walls must be of sufficient height. Thus, the structures of the present invention are also characterized by having relatively "slender" walls. The degree to which the walls and base of the capillary channel structures are slender can be characterized according to a "Slenderness Ratio," the calculation of which is described in the Test Methods sections below. The capillary channel structures of the present invention preferably have a Slenderness Ratio of at least about 9, more preferably at least about 15, most preferably at least about 20 and an average capillary channel width of less than about 0.30 mm, more preferably less than about 0.20 mm, most preferably less than about 0.10 mm.

However, in order for the fluid transport properties of the channel structures to be taken full advantage of, the structures should also be resistant to collapse in the dry, and preferably also in the wet, state. (As used herein, "wet" in relation to the state of the capillary channel structure can include water or other fluid, including organic fluids such as oils, depending upon the fluid intended to be transported and/or absorbed by the structure).

Wall and/or base thickness as well as capillary channel geometry and modulus of elasticity can affect the resistance to collapse of the channels. For purposes herein, resistance to collapse is measured as Compressive Strength (alternately, CS).

The structures of the present invention have a Compressive Strength of at least about 0.2 PSI (approximately 13,800 dynes/cm$^2$), preferably at least about 1.0 PSI (about 69,000 dynes/cm$^2$, more preferably at least about 2.0 PSI (about 138,000 dynes/cm$^2$). That such Compressive Strengths can be obtained with the relatively thin, "slender" walls and bases of the present invention is particularly surprising.

These values for Compressive Strength are achieved when the structure is in a dry state (hereinafter "Dry Compressive Strength") and, preferably, after the structure is immersed in the fluid (e.g., aqueous fluids or oils) which is to be transported and/or stored (hereinafter "Wet Compressive Strength").

The procedures to be used for determining Specific Capillary Volume, Specific Capillary Surface Area, and Compressive Strength are described below under the Test Methods heading.

The structures are especially suited for storage and wicking of fluids, and can be adapted to be of particular suitability for specific types of fluids, such as aqueous fluids and oils. (As used herein, the term "fluid" or "fluids" shall refer to liquids, as opposed to gases).

For structures intended to transport and/or contain aqueous solution, the polymer composition of which the structure is comprised preferably is characterized by an Adhesion Tension with distilled water of at least about 20 dynes/cm, preferably at least about 25 dynes/cm, as measured according to the Adhesion Tension procedure described below. Structures intended to transport and/or contain oil-based fluids and other nonaqueous fluids will preferably be characterized by an Adhesion Tension with n-decane of at least about 10 dynes/cm.

The structures of this invention can be in the form of fibers, wherein in cross-section the base is a solid or hollow axial central core typically having a hydraulic diameter of less than about 0.1 cm, and filament-like ribbons wherein the base element is nominally planar in geometry and typically has a width perpendicular to the longitudinal axis of the capillary channels of less than about 0.5 cm. As used herein, "nominally planar" embodiments wherein the structure's base element can be either planar (i.e., flat) or curvilinear, the width of the structure is referred to as measured in a straightened, non-curvilinear planar state. For convenience, unless otherwise specifically indicated to the contrary, the term "planar" in the context of the base element's geometry shall mean "nominally planar." Also, as used hereafter, the term "fiber" shall refer to both structures with an axial central core as well as the filament-like ribbons, unless otherwise specifically indicated.

The fibers can be utilized in a wide variety of formats, including, for example in the form of bundles, woven and nonwoven fabrics, yarns, etc. Additionally, the fibers can be provided in curled form for use in webs, etc. The fibers, in their various forms, are useful for a wide variety of applications, including absorbent cores in absorbent products (e.g., diapers, catamenials, bandages, etc.), top sheet and fluid distribution sheets in absorbent products, textile applications such as clothing, drug delivery, geriatric fleeces, etc.

In another aspect of the present invention, the capillary channel structures of the present invention are provided in the form of capillary channel sheets having a planar ("planar" is as defined above) base element. The capillary channel sheets will typically have Specific Capillary Volume (SCV) of at least about 1.2 cc/g, preferably at least about 2.0 cc/g, more preferably at least about 2.5 cc/g, most preferably, at least about 4.0 cc/g, and a Specific Capillary Surface Area (SCSA) of at least about 500 cm$^2$g, preferably at least about 2000 cm$^2$/g, more preferably at least about 3000 cm$^2$/g, most preferably at least about 4000 cm$^2$/g. The capillary channel sheets also preferably have a Slenderness Ratio of at least about 3, more preferably at least about 9, even more preferably at least about 15, most preferably at least about 20. Other parameters of the sheets are preferably as previously generally described in connection with the structure hereof. Such capillary channel sheets will typically have a width, measured perpendicularly to the longitudinal axis of the capillary channels, of more than about 0.5 cm, typically more than 2 cm. It should be understood that these are minimum limits, and that the widths of the sheets contemplated are not meant to be limited to such relatively low widths. The sheets meant to be included can be of any width, including, for example, widths on the order of or in excess of the widths of sheets typically made in film blowing processes. The numerical minimum and maximum limits for distinguishing between capillary channel fibers and sheets are provided for conceptual clarity between structures useful primarily for filament-type applications and structures which can be useful for sheet-type applications, and are not meant to necessarily limit the scope of the invention. Capillary channel sheets can be used as fluid distribution sheets in absorbent products (e.g., diapers, catamenials, bandages, fabric conditioner delivery articles, cleaning articles such as wiping and scrubbing products, bandages and toweling useful for drying fluids from surfaces, etc.).

A significant benefits of the capillary channel structures of the present invention is to transport fluid, via intrafiber capillary wicking, to a relatively longer distance from the fluid source or reservoir. Previously, webs of fibrous material which relied primarily on interfiber capillarity suffered from reduced fluid volume transport capability when transport of the fluid to greater distances was emphasized. Conversely, the distance to which the fluid could be transported suffered when the web was designed to transport larger volumes of fluid. The advent of capillary channel structures as described in the Background reduced this trade-off of performance attributes to a limited extent. However, the present invention can provide a combination of capillary capacity, transport height, collapse resistance, and economic efficiency not believed to be previously attained by prior-known capillary channel structures.

The following description, in conjunction with the drawings, describes the invention, various embodiments and modes thereof, in further detail. However, the scope of the invention is particularly and distinctly defined by the claims thereafter.

In an improved process for making capillary channel structures, which is provided herein, improved retention of capillary channel shape can be obtained between extrusion and drawing of the capillary channel structure. Such process comprises:

(a) feeding a flowable, molten polymer composition through a capillary channel orifice of an extrusion die wherein the extrusion die has a capillary channel orifice characterized by an annular base orifice from which a plurality of capillary channel wall orifices radially extend such that the polymer composition upon exiting said extrusion die comprises a hollow annular base and a plurality of capillary channel walls extending radially from said base, said base and said walls forming a plurality of capillary channels, and wherein said extrusion die has a gas inlet port located within the interior of said annular base orifice;

(b) simultaneously with feeding said polymer composition through said extrusion die's capillary channel orifice, feeding a gaseous stream through said gas inlet port in the same direction as the flow of said molten polymer composition; and (c) subsequent to exit of the polymer composition from the extrusion die, drawing the capillary channel structure to a desired size and cooling said structure; whereby said gaseous stream inhibits collapse of said annular capillary channel structure during cooling and drawing of said structure.

The extrusion dies, as described in the above process, are also provided as an aspect of this invention. In particular, such die comprises an extrusion die, said die comprising a capillary channel orifice layer, said layer having an annular base orifice from which a plurality of capillary channel wall orifices radially extend, said capillary channel orifice layer further having an interior region and an exterior region relative to said annular base orifice, a gas inlet pore disposed within the interior region of said annular base orifice, and means for fixably maintaining said interior region in place, relative to said exterior region.

BRIEF DESCRIPTION OF THE DRAWINGS

FIG. 5 is a perspective view of a capillary channel structure of the present invention, depicting wall and base thicknesses and capillary channel depth and width. Also depicted are menisci of fluid as would be contained by the channels of the structure.

FIG. 6 is a perspective view of a capillary channel wall having intercapillary fluid exchange orifices.

FIG. 7 is a direct view of an extrusion die having an orifice design suitable for making capillary channel fibers having a planar base and capillary channels on one side of the base.

FIG. 8 is a direct view of an extrusion die having an orifice design suitable for making capillary channel fibers having a planar base and capillary channels, of alternately varying width, on both sides of the base.

Figure 25:
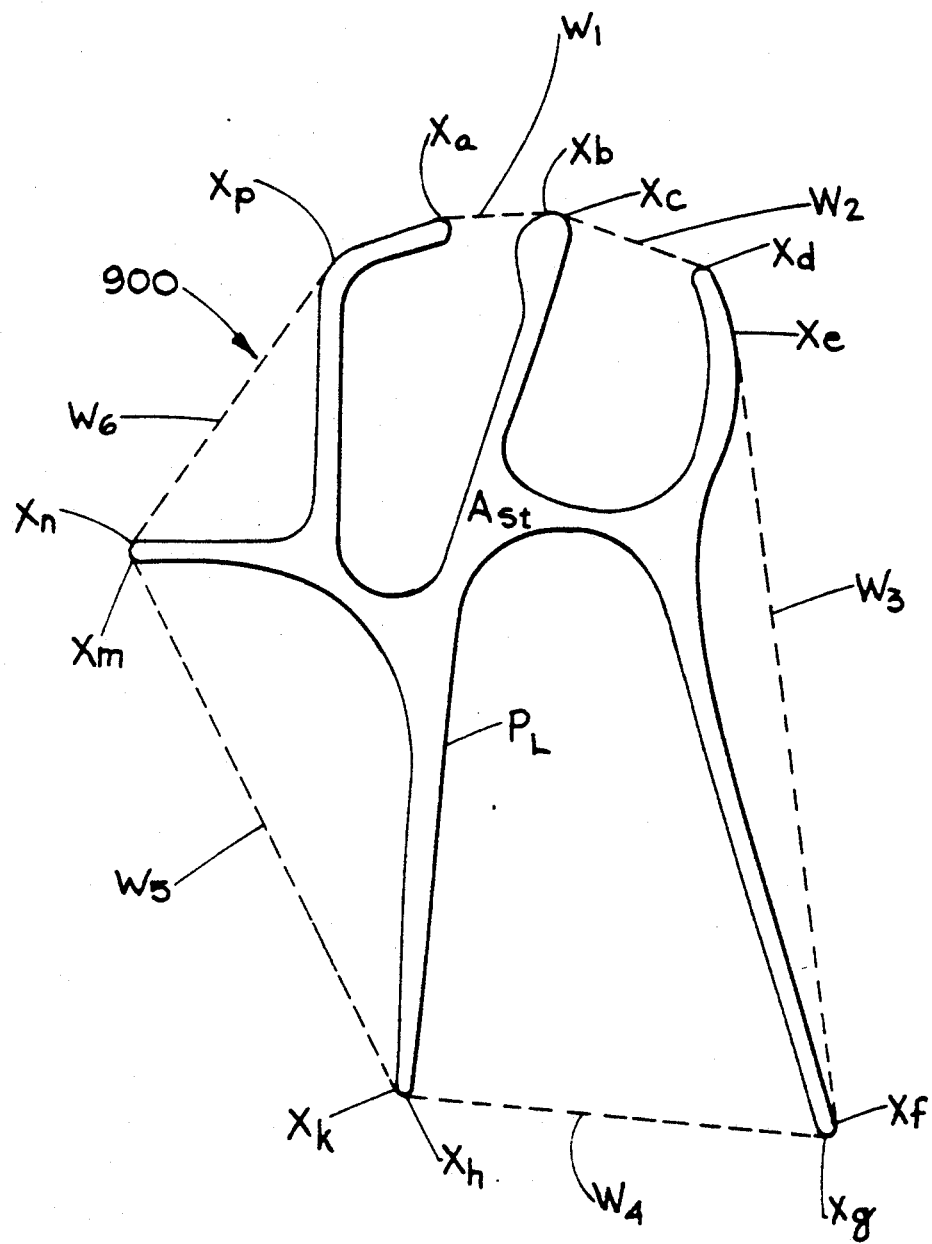

The FIG. 25 is a cross-sectional view of a capillary channel structure which exemplifies various aspects of a procedure for determining Slenderness Ratio and channel width.

Figure 26:
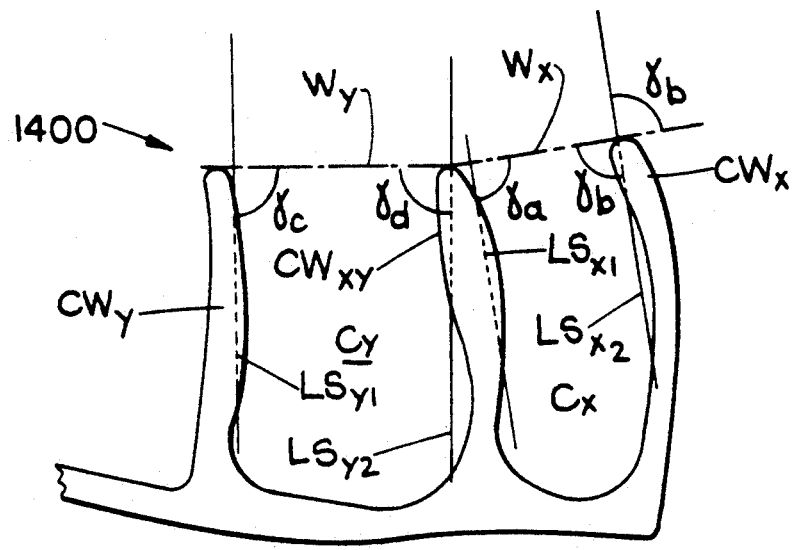

FIG. 26 is a cross-sectional view of a capillary channel structure exemplifying various aspects of a procedure for determining wall parallelism and perpendicularity of the walls to the straight chords closing the capillary channels.

Figure 27:
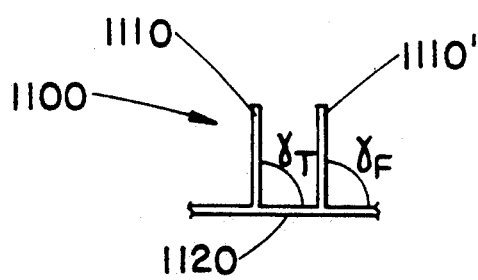

FIG. 27 is a cross-sectional view of a capillary channel structure exemplifying capillary channel walls that are perpendicular to the capillary channel base.

Figure 28:
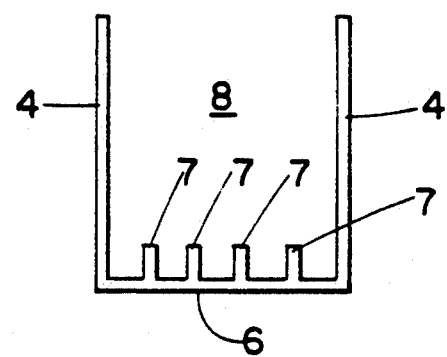

FIG. 28 is a cross-sectional view of a capillary channel having an increased capillary channel base perimeter to base width ratio.

DETAILED DESCRIPTION OF THE INVENTION

The structures of the present invention can be made of any polymeric material that is insoluble in the fluid which is to be contacted with the capillary channel structures. Preferably, the material utilized is a thermoplastic polymer, which can be extruded and drawn via an extrusion process to form the final product. Examples of suitable polymeric materials are polyester, polyethylene, polypropylene, polyamide, chemical cellulose-based polymers such as viscose and di- or tri-acetate, and polystyrene. Co-, ter-, etc. polymers and grafted polymers can also be used. One type of thermoplastic polymer that is believed to be of utility in connection with this invention are polyesters and copolymers of dicarboxylic acids or esters thereof and glycols. The dicarboxylic acid and ester compounds used in the production of polyester copolymers are well known to those of ordinary skill in the art. They include terephthalic acid, isophthalic acid, p,p'-diphenyldicarboxylic acid, p,p'-dicarboxydiphenyl ethane, p,p'-dicarboxydiphenyl hexane, p,p'-dicarboxydiphenyl ether, p,p'-dicarboxyphenoxy ethane, and the like, and the dialkylesters thereof that contain from 1 to about 5 carbon atoms in the alkyl groups thereof.

Aliphatic glycols useful for the production of polyesters and copolyesters are the acrylic and alicyclic aliphatic glycols having from 2 to 10 carbon atoms, such as ethylene glycol, trimethylene glycol, tetramethylene glycol, pentamethylene glycol, and decamethylene glycol.

It is additionally contemplated to utilize copolymers or graft copolymers, terpolymers, chemically modified polymers, and the like, which permanently exhibit high surface hydrophilicity and do not require the use of wetting agents, which may wash away from the structure surface upon contact with fluids. Modified polymers which can exhibit permanent hydrophilicity include chemical cellulose polymers such as cellulose acetates. In addition, one can also include pigments, delusterants or optical brighteners by the known procedures and in the known amounts.

In general, the thermoplastic polymers utilized preferably do not have an abrupt melting point (for processing reasons hereafter discussed), but rather are amorphous and become progressively softer with increasing temperature above the glass transition temperature. It is additionally desirable that the polymer have sufficient cohesive strength such that it can be drawn in extrusion processes to the sizes desired. In general polymers which can be drawn to draw ratios of at least about 1000:1 without undue breakage, preferably at least about 2000:1, to provide final products which, if in fibrous form would have a monofilament denier ranging from about 2 to about 500 are preferred.

A preferred type polyester for use in the present invention is glycol modified poly(ethylene terephthalate) (PETG) copolyester. Suitable PETG is available from Eastman Chemical Products, Inc. (Kingsport, Tenn., USA), under the name KODAR TM 6763, with a glass transition temperature of about 81° C.

In addition to extrudability of the polymer, the modulus of elasticity can also be of importance. Since the capillary channel structures of the present invention comprise relatively thin capillary channel walls which can become subject to compressional or other external forces, the polymer used to make the structures should be resistant co compressive strain. The polymer material used herein will preferably have a modulus of elasticity of at least about 100 MPa, more preferably at least about 750 MPa, most preferably at least about 1250 MPa, at temperatures at which the capillary channel structures are likely to be used. Such temperatures will typically range from about 15° C. to about 40° C., though it is not intended to thereby limit the invention. KODAR TM 6763, for example, is a material which is quite useful for use in the present invention and has a modulus of elasticity of about 1700 MPa.

Another factor affecting polymer choice is amenability to chemical modification of its surface for increasing, for example, hydrophilicity. Thus, for capillary channel structures intended for absorbing and/or transporting aqueous based solutions, it may be preferably to use a polyester-based polymer rather than, for example, a polypropylene, although such preference is not meant to thereby limit the scope of the invention. Also, depending upon the intended use of the structures, it may be desirable that the polymer material utilized be flexible at the temperatures at which the structures are intended to be used. Due to the relatively thin walls and bases of the structures hereof, even relatively high modulus polymers can be used to make structures that are both flexible and soft, yet which retain surprisingly high resistance to collapse. Flexibility will depend upon such factors as the thickness and dimensions of the capillary channel walls and base, as well as the modulus of elasticity. Thus, choice of polymer in this regard will be highly subject to the intended use and temperature conditions. Choice of such suitable polymer material is well within the ability of one of ordinary skill in the art.

Depending upon the intended use, the capillary channel structures can be made from polymers that are either hydrophilic or oleophilic, or can be treated to be hydrophilic or oleophilic.

The surface hydrophilicity of polymers used to make the capillary channel structures of the present invention can be increased to make the capillary channel walls more wettable to aqueous solutions by treatment with surfactants or other hydrophilic compounds (hereafter, collectively referred to as "hydrophilizing agents") known to those skilled in the art. Hydrophilizing agents include wetting agents such as polyethylene glycol monolaurates (e.g., PEGOSPERSE TM 200ML, a polyethylene glycol 200 monolaurate available from Lonza, Inc., Williamsport, PA, USA), and ethoxylated oleyl alcohols (e.g., VOLPO TM -3, available from Croda, Inc., New York, N.Y., USA). Other types of hydrophilizing agents and techniques can also be used, including those well known to those skilled in the fiber and textile arts for increasing wicking performance, improving soil release properties, etc. These include, for example, surface grafting of polyacrylic acid, Suitable commercially available hydrophilizing agents include ZELCON TM soil release agent, a nonionic hydrophile available from DuPont Co., Wilmington, Del. (USA) and Milease T TM , comfort finish available from ICI Americas, Inc., Wilmington, Del., USA.

Typically, up to about 5%, of such hydrophilizing agents are used based upon the weight of the polymer, although its not meant to limit the scope to such typical upper amount. Hydrophilizing agents can be added to the polymer at various stages prior to use, though preferably prior to drawing of the structures to final size. For example, the hydrophilizing agent can be added in advance to the polymer prior to melting or blended into the polymer subsequent to melting. The additive hydrophilizing agent can also be applied to the polymer subsequent to formation, e.g., subsequent to exit from an extrusion die in a melt, wet, or dry spinning process, preferably prior to drawing to small effective diameters. When applying hydrophilizing agent to the formed structures, techniques such as preparing an aqueous solution of the compound and dipping the structure in the solution or, alternatively, the spraying solution can be useful for directing the hydrophilizing agent to the interior surfaces of the capillary channels. The hydrophilizing agent can be applied to the structure in a low concentration solution. Subsequently, the structure is dried or allowed to dry by evaporative techniques. One effective method of application, is to immerse the structure in a denatured alcohol solution containing, for example, approximately 0.3% of the wetting agent for about 30 minutes and then allowing the structures to air dry on a wire screen.

When the hydrophilizing agent is incorporated into the molten polymer before the polymer has been formed into the capillary channel structure, the hydrophilizing agent can "bloom," or migrate to the surface of the extruded structure upon cooling. This melt-addition is desirable since it avoids the necessity of drying any fluid carrier that would typically be used when applying such a hydrophilizing agent to the formed structure. Suitable hydrophilizing agents for addition to polymer melts include the previously mentioned VOLPO TM 3, polyoxyalkylene fatty acid esters, and alkoxylated alkyl phenol combined with a mixed mono-, di-, and/or tri- glyceride. One process for preparing polymeric fibers from melts containing hydrophilizing agents is described in more detail in U.S. Pat. No. 4,378,144, Sawyer et al., issued Mar. 25, 1986, which is incorporated by reference herein.

Thermoplastic polymers often used in the film blowing and textile industries, which include polyesters, polyamides, polypropylenes, etc., are typically oleophilic and do not require additional treatment to make them wettable to nonaqueous, organic fluids. However, if aqueous fluids are to be transported, it is generally desirable to apply a hydrophilizing agent to such polymer compositions to facilitate transport of the aqueous fluids.

The capillary channel structures of the present invention have an axial base and at least two walls extending from the base, whereby the base and walls define at least one capillary channel. Preferably, the structures will comprise at least five walls and at least four capillary channels, more preferably at least six walls and at least five capillary channels. There is no theoretical maximum number of capillary channels that the structure hereof can have, such maximum number of capillary channels being governed more by need for such structures and practicability of making them. The capillary channels are substantially parallel with one another and an open cross-section along at least about 20% of their length, more typically along at least about 50% of their length, and most typically, along from at least 90% to 100% of their length.

This invention provides flexible, collapse-resistant, capillary channel structures comprising a polymer composition and having at least one intrastructure capillary channel, wherein the structures have an axial base and at least two walls extending from the base, typically (but not necessarily) along substantially the entire length of the base element, whereby the base element and walls define said capillary channel(s). In general, the walls should extend from the base for a distance in the axial direction of the base for at least about 0.2 cm, preferably at least about 1.0 cm. The actual length of the structure is limited only by practical concerns. Although the capillary channel structures hereof may have one capillary channel or a plurality of capillary channels, for convenience the plural form "channels" is used with the intent that it shall refer to a singular "channel" in structures having only one such channel or a plurality of channels in structures having more than one channel. The structures are further characterized in that the capillary channels are open along a substantial length such that fluid can be received from outside of the channel as a result of such open construction. In general, the structures will typically have Specific Capillary Volume (SCV) of at least about 2.0 cc/g, preferably at least about 2.5 cc/g, more preferably, at least about 4.0 cc/g, and a Specific Capillary Surface Area (SCSA) of at least about 2000 cm$^2$/g, preferably at least about 3000 cm$^2$/g, more preferably at least about 4000 cm$^2$/g. The procedures to be used for measuring SCV and SCSA are described in the Test Methods section.

These values are believed to be significantly higher than the corresponding combination of values for conventional fibrous materials and previously disclosed capillary channel structures, and are indicative of the improved fluid capacity and the improved capacity to transport and store fluid on a structure weight basis that characterize the structures of the present invention.

In general, SCV is a measure of the volumetric fluid capacity of the absorbent structure on a unit weight basis, and is therefore indicative of the economic efficiency of the absorbent structure. However, in order for a structure with high SCV to also have high capillary suction (i.e., have excellent ability to wick fluids at a substantial volumetric rate, on a unit weight basis of the structure, via intra-structure capillary transport), the design of the structure must provide for a relatively high degree of capillary channel surface area contact between the material of the solid structure and the liquid which is to be transported. This is because capillary suction (alternately, "hydrostatic tension") is in part dependent upon the amount of interfacial contact area between the solid structure and fluid. The SCSA is a measure of the surface area, per unit weight of the structure, of the capillary channels in the structures hereof available for contact with fluids. The combination of required SCV and SCSA as set forth herein is met by providing capillary channel structures with efficient capillary channel design and, importantly, with relatively thin capillary channel walls and/or channel bases.

As described above, the capillary channel structures of the present invention are characterized by having relatively thin walls and bases compared to the width of the capillary channels. However, in order to provide capillary channels of sufficient SCV, the walls must be of sufficient height. Thus, the structures of the present invention are also characterized by having relatively "slender" walls. The degree to which the walls and base of the capillary channel structures are slender can be characterized according to their "Slenderness Ratio," the calculation of which is described in the Test Methods sections below. The capillary channel structures of the present invention preferably have a Slenderness Ratio of at least about 9, more preferably at least about 15, most preferably at least about 20 and at least about 30%, preferably at least about 50%, more preferably at least about 75%, of the capillary channels have capillary channel width of less than about 0.30 mm, more preferably less than about 0.20 mm, most preferably less than about 0.10 mm. Capillary channel width is measured as described in the Test Methods section, as the length of the straight chord closing the capillary channels.

However, in order for the fluid transport properties of the channel structures to be fully realized, the structures should also be resistant to collapse in the dry, and preferably also in the wet, state. (As used herein, "wet" in relation to the state of the capillary channel structure can include water or other fluid, including organic fluids such as oils, depending upon the fluid intended to be transported and/or absorbed by the structure). Wall and/or base thickness as well as capillary channel geometry and modulus of elasticity can affect the resistance to collapse of the channels. For purposes herein, resistance to collapse is measured in general as Compressive Strength (CS).

The structures of the present invention have a Dry Compressive Strength of at least about 0.2 PSI (approximately 13,800 dynes/cm$^2$), preferably at least about 1.0 PSI (about 69,000 dynes/cm$^2$, more preferably at least about 2.0 PSI (about 138,000 dynes/cm$^2$). The structures preferably also have Wet Compressive Strength within these same numerical criteria upon utilizing whatever fluid is to be transported and/or stored. Structures to be used for transport and/or storage of aqueous solutions preferably have a Wet Compressive Strength within such numerical criteria with distilled water as the wetting fluid. For transport and/or storage of organic fluids, such as oils, the Wet Compressive Strength with n-decane as the wetting fluid should preferably meet such numerical criteria.

The procedures to be used for determining Compressive Strength (Wet and Dry) are described below under the Test Methods heading.

The capillary channel structures of this invention are integral, physically self-supportive articles, in that they do not require or utilize secondary means for providing or maintaining physical integrity of their shape or structure. For example, they need not be attached or adhered to a separate hard surface in order to be useful for their intended purpose of fluid transport and/or storage.

For structures intended to transport and/or contain aqueous fluid, the polymer composition of which the structure is comprised preferably is characterized by an Adhesion Tension with distilled water of at least about 20 dynes/cm, preferably at least about 25 dynes/cm, as measured according to the Adhesion Tension procedure described below. Structures intended to transport and/or contain oil-based fluids and other nonaqueous fluids will preferably be characterized by an Adhesion Tension with n-decane of at least about 10 dynes/cm.

The structures can be in the form of fibers, wherein the base is a solid or hollow central axial core typically having a hydraulic diameter of less than about 0.1 cm, or filament-like ribbons wherein the base element is nominally planar in geometry and typically has a width perpendicular to the longitudinal axis of the capillary channels of less than about 0.5 cm. As used herein, "nominally planar" embodiments wherein the structure's base element can be either planar (i.e., flat) or curvilinear, the width of the structure is referred to as measured in a straightened, non-curvilinear planar state. For convenience, unless otherwise specifically indicated to the contrary, the term "planar" in the context of the base element's geometry shall mean "nominally planar." Also, as used hereafter, the term "fiber" shall refer to both fibers with an axial core and the filament-like ribbons, unless otherwise specifically indicated.

The fibers can be utilized in a wide variety of formats, including, for example in the form of bundles, woven and nonwoven fabrics, yarns, etc. Additionally, the fibers can be provided in curled form for use in webs, etc. The fibers, in their various forms, are useful for a wide variety of applications, including absorbent cores in absorbent products (e.g., diapers, catamenials, bandages, etc.), top sheet and fluid distribution sheets in absorbent products, textile applications such as clothing, drug delivery, geriatric fleeces, etc.

For most applications, the fibers typically have tensile strengths of at least about 2 g per fiber, more typically from about 50 to about 200 g per fiber. Tensile strength can be determined according to ASTM Standard Test Method D 2101-82.

In another aspect of the present invention, the capillary channel structures of the present invention can be provided in the form of capillary channel sheets having a planar (as defined above) base element. The capillary channel sheets will typically have Specific Capillary Volume (SCV) of at least about 1.2 cc/g, preferably at least about 2.0 cc/g, more preferably at least about 2.5 cc/g, most preferably, at least about 4.0 cc/g, and a Specific Capillary Surface Area (SCSA) of at least about 500 $cm^2/g$, preferably at least about 2000 $cm^2/g$, more preferably at least about 3000 $cm^2/g$, most preferably at least about 4000 $cm^2/g$. The capillary channel sheets also preferably have a Slenderness Ratio of at least about 3, more preferably at least about 9, even more preferably at least about 15, most preferably at least about 20. Other parameters of the sheets are preferably as previously generally described in connection with the structure hereof. Such capillary channel sheets will typically have a width, measured perpendicularly to the longitudinal axis of the capillary channels, of more than about 0.5 cm, typically more than 2 cm. It should be understood that these are minimum limits, and that the widths of the sheets contemplated are not meant to be limited to such relatively low widths. The sheets meant to be included can be of any width, including, for example, widths on the order of or in excess of the widths of sheets typically made in film blowing processes. The numerical minimum and maximum limits for distinguishing between capillary channel fibers and sheets are provided for conceptual clarity between structures useful primarily for filament-type applications and structures which can be useful for sheet-type applications, and are not meant to necessarily limit the scope of the invention. Capillary channel sheets can be used as fluid distribution sheets in absorbent products (e.g., diapers, catamenials, bandages, fabric conditioner delivery articles, cleaning articles such as wiping and scrubbing products, bandages and toweling useful for drying fluids from surfaces, etc.).

Parameters materials for defining and evaluating performance of capillary channel structures encompass the ability of the structure to transport and/or contain fluid (on a volumetric basis) per unit time, per unit weight of the structure, as well as the ability to transport fluid a particular distance and linear rate of fluid transport.

One specific measure of the ability of a structure to both transport a certain volume of fluid and to transport it via capillary action to a certain distance is capillary sorption. Capillary sorption is an equilibrium measure of fluid capacity (on a structure-weight basis) as a function of capillary suction measured as vertical height of rise. Capillary sorption is indicative of the ability of a capillary structure to contain fluid against gravity or other absorbent materials, and can also be indicative of the efficiency at which a capillary channel structure transports fluid on a structure-weight basis. In embodiments of the invention especially suited for application to aqueous fluids, the capillary structures will preferably exhibit a Capillary sorption (according to the test hereinafter described) of at least about 1.5 cc/g at 5.0 cm capillary suction (i.e., hydrostatic tension), utilizing distilled water as the fluid, more preferably at least about 4.0 cc/g at 10.0 cm.

In embodiments of the invention particularly suited for transport and/or storage of nonaqueous fluids (e.g., oils, alcohols, etc.), the capillary channel structures will preferably be oleophilic and, more preferably have a Capillary Sorption of at least about 1.5 cc/g at 3.0 cm, more preferably at least about 3.0 cc/g at 5.0 cm, for the fluid which is to be handled. In general, the preferred capillary channel structures can attain the above levels with n-decane as the test fluid. The procedures to be used for determining Capillary Sorption for both aqueous and nonaqueous fluids are described in the Test Methods section below.

Additional significant parameters for defining and evaluating capillary channel structures include rate-dependent parameters such as the rate at which fluid is vertically wicked via capillary action (measured as height of fluid rise per unit time).

In embodiments of the present invention intended to transport aqueous fluids, the capillary channel structures preferably exhibit Vertical Wicking Rates of at least about 3.0 cm in the initial ten minutes of the wicking period, more preferably at least about 3.0 cm in the initial five minutes. Wherein, Dyed Distilled Water (with 0.05% of FD&C Blue #1) is utilized as the transported fluid. The procedure for determining Vertical Wicking Rate for hydrophilic structures is described in the Test Methods section below.

As discussed above, the cross-section of the capillary channels are open along a substantial axial length, to receive fluid, and can be open along the entire length of the channels. Portions of the channel may be closed (i.e., "tube-like"), particularly in areas contemplated primarily for transport of fluid which has been previously absorbed by the structure. The capillary channels can be closed, for example, by covering the open capillary channels with a thermoplastic film and by bonding the film in position. Such closure of the channels is especially contemplated for application to the capillary channel sheets hereof.

Typically, the capillary channels are open along a substantial length to form at least one fluid reception region which can receive fluid. What is meant by "open" is that in such fluid reception regions, the capillary channel walls extend from the base, but ends of the walls distal to the base do not close the channel either directly (e.g., by adjoining to one another) or indirectly (e.g., by adjoining another structural element or elements connecting the walls).

The size and shape of the capillary channels, and the dimensions of the walls and base element can vary to the extent that is consistent with the previously described Specific Capillary Volume, Specific Capillary Surface Area, and Compressive Strength parameters.

The capillary channel structures of the present invention will typically have wall thickness of less than about 50 microns, preferably less than about 10 microns, more preferably less than about 5 microns. The capillary channel base thicknesses, for structures with planar bases, will preferably be less than about 50 microns, and often of thickness 0.75 times to about 3.0 times the wall thickness. An overall measurement indicative of base and wall thicknesses is the Average Structure Thickness ($t_{ave}$). A procedure for determining $t_{ave}$ is described below in the Test Methods section. Preferably, $t_{ave}$ is less than about 50 microns, more preferably less than about 10 microns, most preferably less than about 5 microns. For sheets and filament-like ribbons, it is believed that increased Compressive Strength may be obtained by providing capillary channel bases which are thicker (e.g., 1.5-3X thicker than the Average Structure Thickness ($t_{ave}$) without undue decreases in Specific Capillary Surface Area and Specific Capillary Volume.

The width of the capillary channels will generally be less than about 0.5 mm, preferably less than about 0.3 mm, more preferably less than about 0.1 mm. the precise capillary channel widths which are optimal will vary depending upon the particular structure design and application. Channel widths from about 5 microns to about 0.5 mm will typically be used, more typically about 30 microns to about 100 microns, although it is not meant necessarily to exclude larger or, particularly, smaller widths from the scope of the invention. In general, for capillary channel width can be measured by photographing a magnified view of a cross-section of the structure, determining the width, and compensating for the degree of magnification. The procedure to be used for determining width is described in more detail below in the Test Methods Sections.

The capillary channels of the structures of the present invention are generally parallel to one another in the axial direction of the channels. The capillary channel structures may contain intercapillary channel fluid exchange orifices between adjacent capillary channels of a capillary channel structure. Preferably, such fluid exchange orifices will not extend along the entire height of the capillary channel wall and, additionally, will not reach the base of the capillary channel. More preferably, the capillary channel wall will extend from the capillary channel base for a distance at least as great as the width of the capillary channel before interruption by the fluid exchange orifice. The walls of the capillary channels preferably contain no intersections with nonparallel capillary channels, although if the structures do contain such intersections of capillary channels, the aforementioned Capillary Sorption and Vertical Wicking Rate parameters will still, preferably, be maintained. If intersections with nonparallel walls are present, the capillary channel wall should preferably extend from the capillary channel base at least about a distance equivalent to the width of the channel at the base before interruption of the fluid exchange orifice which facilitates fluid transfer between channels. Additionally, the channels through which the fluid is to be transported are not substantially interrupted in the direction of intended flow by the presence of baffles or other flow-interrupting means. FIG. 6 displays a capillary channel wall 4 with two types of capillary channel fluid exchange orifices. Specifically shown are capillary channel wall notches 28' and capillary channel wall pores 28''.

Figure 1:
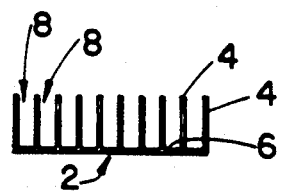
FIG. 1 is a cross-sectional view of a capillary channel structure of the present invention. The structure shown is a capillary channel ribbon, referred to herein by the collective term "fiber", and has capillary channels on one side of its base.
Figure 2:
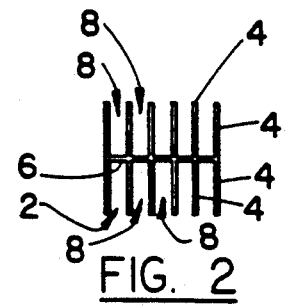
FIG. 2 is a cross-sectional view of a capillary channel fiber of the present invention, having capillary channels on opposing sides of its base.
Figure 3:
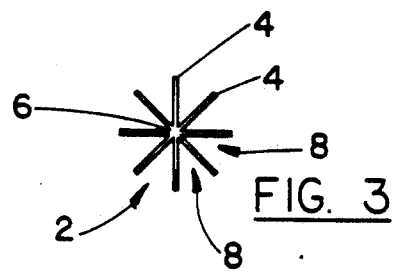
FIG. 3 is a cross-sectional view of a capillary channel fiber of the present invention having a base from which capillary channel walls radically extend to form the capillary channels.

FIGS. 1, 2, and 3 are cross sectional drawings of exemplary capillary channel structures 2, each having a base 6, capillary channel walls 4 extending from the base 6, and open capillary channels 8 formed by the base 6 and two adjacent capillary channel walls 4. The capillary channel structure cross section of FIG. 1 is representative of a "ribbon"-type fiber having a planar base, and capillary channel walls extending from one side of the base. In FIG. 2, the capillary channel structure represented by the cross section i similar to that of FIG. 1, except that capillary channel walls 4 extend from both sides of the base 6. In FIG. 3, the cross section of the capillary channel structure 2 is of a fiber wherein the base 6 is, in essence, a central core at the intersection of the capillary channel walls 4 which radially extend outwardly from the core.

Figure 4:
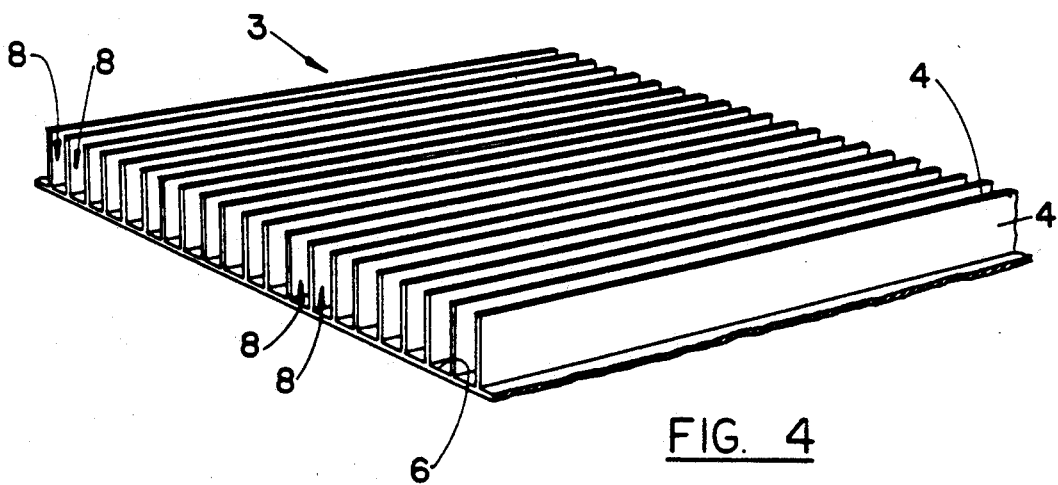
FIG. 4 is a perspective view of a capillary channel sheet of the present invention.

FIG. 4 is a perspective drawing of a capillary channel sheet 3 having a planar base 6, capillary channel walls 4 extending from one side of the base 6, which form (in conjunction with base 6) capillary channels 8. The sheet 3 can be flexible and may therefore be easily contoured, especially the direction transverse to the longitudinal axis of the capillary channels. Flexibility in such direction can be of similar degree to that of a conventional film of thickness and material equivalent to the capillary channel base 6.

FIG. 5 is a perspective drawing of a preferred capillary channel structure 2 having capillary channel base 6, capillary channel walls 4, and capillary channels 8. Also shown is capillary channel wall height $A_1-A_2$, capillary channel width $F_1-F_2$, base thickness $D_1-D_2$, and wall thickness $C_1-C_2$. Also exemplified are fluid menisci 10, although such menisci 10 represent a fluid/air boundary and are not an element of the structure 2. Menisci 10 exemplify the containment of fluid (not shown) in the capillary channels. $A_1-A_2$, $C_1-C_2$, $D_1-D_2$, and $F_1-F_2$ are preferably of sizes previously discussed.

Also, preferably, the capillary channel structure of the present invention will have a capillary wall height to capillary channel width (capillary channel width, CCW, measured as described in the Test Methods section) exemplified as the ratio of $A_1-A_2/F_1-F_2$ in FIG. 5, of from about 0.5:1 to about 10:1, preferably from about 1:1 to about 5:1.

The capillary channels can be of regular (e.g., U-shaped, V-shaped, ⊔-shaped or can be irregular cross-sectional shape. Preferably, the capillary channels will be of regular cross-sectional shape, with capillary channel walls that are substantially parallel to one another in cross-section. Also preferably, the capillary channel walls are substantially perpendicular to the straight chords closing the capillary channels to which the wall serves as a boundary.

In addition to or in the alternative of perpendicularity of the walls to the chords closing the channels, the capillary channel walls are preferably substantially perpendicular to the base. Substantially parallel, as used herein in reference to cross-sectional parallelism of the walls, means that the alignment differential of adjacent capillary walls is by no more than about 40°, preferably by no more than about 30°, more preferably no more than about 20°. In the typical case, wherein the capillary channel walls are linear, determination of the degree of parallelism will be straightforward. A photomicrograph of the cross-section can be used to determine the angle of the walls relative to one another by conventional geometrical analytical methods. Relative capillary channel wall parallelism for nonlinear cross-section capillary channel walls can be determined as described below in the Test Methods section. Substantially perpendicular, as used herein, means an angle of the wall relative to the chord and/or base of within 90°± about 30°, preferably 90°± about 15°. Again, in the case wherein the capillary channel walls are linear, determination of substantial perpendicularity to the closing chords and the base will be a straightforward determination based on a photomicrograph of a cross-section of the structure. The straight chords closing the channels are drawn as described in the Parallelism/Perpendicularity Procedures. For structures having nonlinear capillary channel walls, procedures are provided in the Parallelism/Perpendicularity Procedures, below, for the determination. Although not intended to necessarily limit the invention, substantially parallel walls are believed to provide enhanced Capillary Sorption as a result of increased capillary fluid capacity and capillary suction per unit weight of the structure. Providing walls that are substantially parallel and substantially perpendicular to the straight closing chords and/or to the base is believed to provide improved Compressive Strength.

In general, the higher the percentages are of capillary channels that are formed by substantially parallel walls and by walls that are substantially perpendicular to the base and/or to the closure chords, the more preferred is the capillary channel structure. Thus, preferably at least about 30%, more preferably at least about 50%, even more preferably at least about 75%, and most preferably at least about 90% of the Specific Capillary Volume of a structure is within capillary channels that are formed by substantially parallel walls, more preferably by walls that have an alignment differential of no more than about 30°, most preferably no more than about 20°. Also, preferably at least about 30% of the Specific Capillary Volume, more preferably at least about 50%, even more preferably at least about 90%, is within capillary channels formed by capillary channel walls that are substantially perpendicular to the closure chords closing their corresponding capillary channels and/or to the base, and more preferably the walls are at an angle relative to the closure chords and/or the base within 90°± about 15°.

Figure 17:
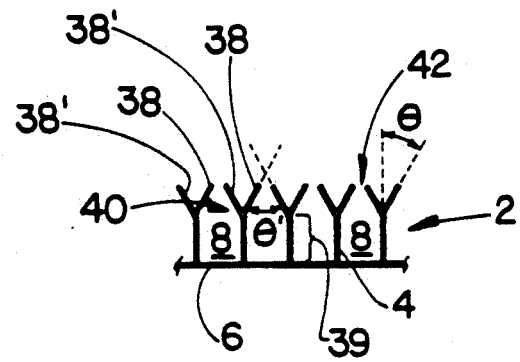
FIG. 17 is a cross-sectional view of a capillary channel structure having bottle-shaped capillary channels of a general type that could be made from an extrusion die as depicted in FIG. 16.

FIG. 17 shows a drawing of a cross section of a capillary channel structure 2 having regularly-shaped open capillary channels 8 formed by capillary channel base 6 and capillary channel walls 4. The walls 4 include distal wall extensions 38, 38' at the ends of the walls 4 distal to the base 6. Each distal wall extension 38 or 38' extends outwardly at an angle $\theta$, preferably from about 10° to about 80°, more preferably from about 25° to about 40°, relative to the axis of proximal end of the walls 39 so as to form, in conjunction with the adjacent wall having an opposing distal wall extension 38' or 38, a tapered neck 40 leading to the mouth, or fluid reception region 42, of the capillary channel 8. The tapered capillary channel shape exemplified in FIG. 17 can be referred to generally as a bottle-shape. For purposes herein, with regard to tapered capillary channel shapes formed by walls which intersect with substantially parallel walls 4 with tapering necks 40, perpendicularity of the capillary channel walls to linear chord closing the channel shall be calculated on the basis of the linear, proximal ends 39 of the walls 4. In general, the portion of the capillary channel walls forming the tapered region of the capillary channel which narrows toward the capillary channel mouth are preferably at an angle relative to one another such that if they were extended until the point of intersection, the intersection angle $\theta'$ would be from about 20° to about 160°, preferably from about 50° to about 80°. Higher angles for $\theta'$ is less desired since such $\theta$'s are believed to result in reduced ability for fluid to enter into the channel.

As discussed previously, the capillary channels can be of various shapes. Certain shapes can offer particular advantages in particular product applications. ⊔-shaped capillary channels typically provide maximum Specific Capillary Volume and Specific Capillary Surface Area for a given amount of polymer. U-shaped capillary channels may be particularly desirable in application wherein the structures are to be used in contact with or in close proximity with skin, and wherein skin-dryness is a high priority. It is believed, though it is not intended to limit the invention thereby, that U-shaped capillaries more completely drain after fluid has been transported and therefore minimize any likelihood of backflow. This is a result of the absence of cross-sectional geometric features which would allow establishment of menisci with radii of curvature smaller than that of the cross-section of the U-shaped channel. V-shaped capillary channels, on the other hand, inherently accommodate menisci of a variety of radii (up to a maximum radius determined by the length of the capillary channel walls) and therefore, can provide variable, automatically adjustable capillary suction. A meniscus present at the wider portions of the channel, for example, would have a larger radius and less capillary suction than a meniscus present at a more narrow portion of the channel. The position of the meniscus will be determined, in part, by the volume of fluid present in the channel and in the fluid reservoir feeding the channel. As the amount of fluid decreases or increases, the menisci of V-shaped capillary channels automatically adjust to a level optimizing capillarity. Thus, V-shaped capillary channels may be desirable in applications, for example, wherein a wide range of operational fluid level conditions may be encountered, such that this self-adjusting aspect of the channels is utilized.

Bottle-shaped capillary channel cross-sections, such as described above in connection with FIG. 17, or other cross-sectional shapes having capillary channel mouth widths which are smaller than the maximum width of the channel are believed to provide increased capillary suction, due to having menisci with smaller radii of curvature radii relative to the radii corresponding to the mensici that would otherwise exist at larger width, in combination with a low flow resistance corresponding to a capillary channel of constant width equal to such larger width. Thus, wicking rate is believed to be enhanced.

Figure 20:
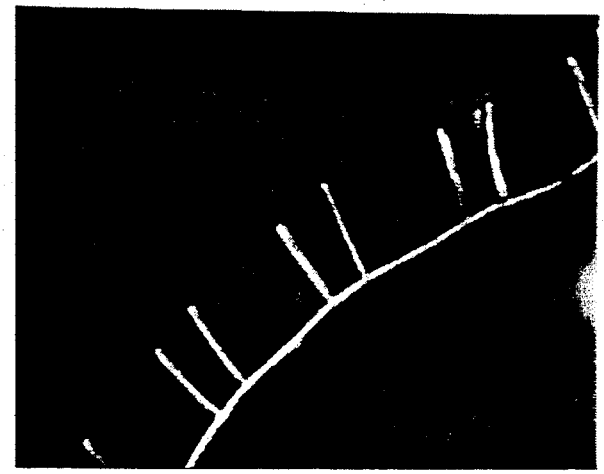
FIG. 20 is a photomicrograph (325X) of a capillary channel structure cross-section wherein the structure has capillary channels of different widths.
Figure 21:
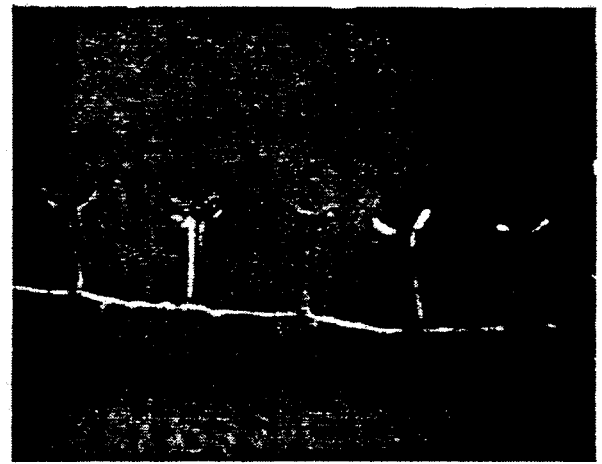
FIG. 21 is a photomicrograph (325X) of a capillary channel structure cross-section wherein the capillary channels are bottle-shaped
Figure 22:
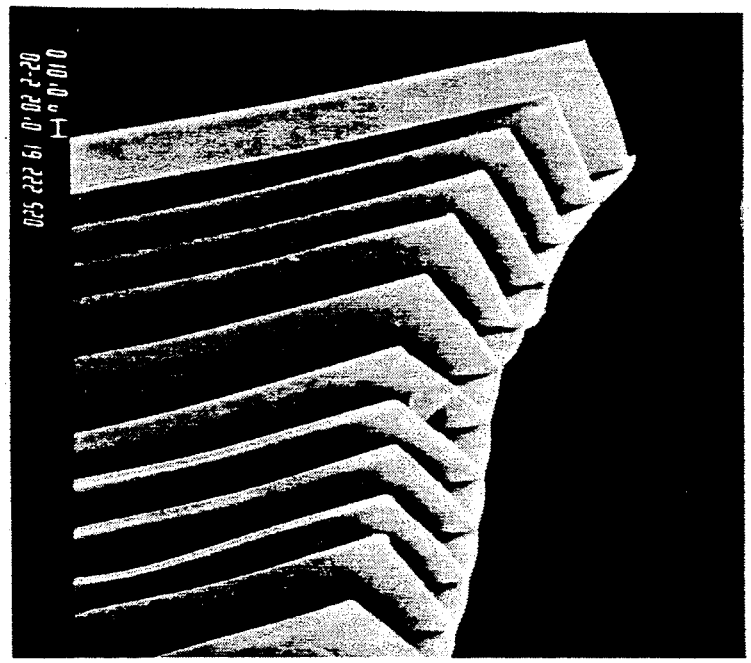
FIG. 22 is a scanning electron microscope (SEM) photomicrograph (200X) of a perspective view of capillary channel structure having a planar base.

It is also contemplated to vary the capillary channel widths of capillary channels within a single capillary channel structure. As discussed above, capillary suction, or hydrostatic tension, varies inversely with channel width. Therefore, by combing capillary channels of two or more significantly differing widths, fluid handling properties of divergent character can be accomplished by a single structure. For example, certain of the channels could be of relatively small size to facilitate capillary transport to a particular distant location from the region of initial absorption, whereas other channels could be of relatively large size to facilitate rapid acquisition of the fluid. Another benefit of structures with a variety of capillary channel widths is enhanced fluid transfer between channels of abutting structures. Such capillary channel structures could also have capillary channel wall orifices, to increase transfer of fluid from the large to the small capillary channels of a single capillary channel structure. FIG. 20 shows a photomicrograph of a cross section of a capillary channel structure embodying this concept. The structure shown has capillary channels of two distinct widths, one width corresponding approximately to a capillary wall height to capillary channel width ratio of about 2:1; and the other, corresponding to an about 0.8:1 ratio. For ⊔-shaped channels, wall height is determined as shown in FIG. 5. For U-shaped, V-shaped, tapered channels, channels with tapered walls, and irregularly shaped channels, wall height of the channel can be calculated as one-half the inside perimeter of the channel walls and base.

Figure 23:
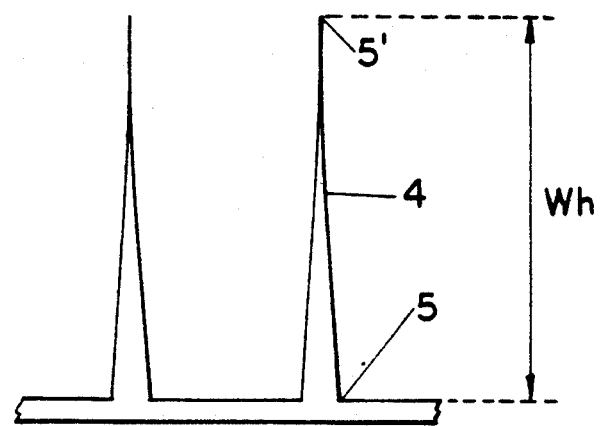
FIG. 23 is a cross-sectional view of a capillary channel structure having tapered capillary channel walls.

In another variation of the present invention, the capillary channel wall 4 is tapered, as in FIG. 23, such that it is wider at the base end 5 than at the distal end 5' of the wall 4. This type of design may be desirable for increasing Compressive Strength of the structures of the present invention. Preferably, such tapered walls have a maximum width which is no more than about three times the average width, wherein the average width is calculated as wall cross-sectional area divided by wall height (Wh).

A further improvement in capillary channel structure performance can be obtained by capillary channels having increased interior surface roughness. Increased surface roughness is believed to improve capillary performance by decreasing the contact angle at the leading edge of the interface between fluid and solid (i.e., the base). In general, increasing walls roughness to increase the ratio of the actual inside perimeter of the capillary channel to the corresponding smooth perimeter is believed to improve performance. Referring to FIG. 28, shown is a cross-section of a preferred capillary channel structure having a planar base. The capillary channel 8 has capillary channel walls 4 and capillary channel base 6. Base 6 is characterized by ribs 7 extending from the base, which increase surface roughness and thereby reduce leading edge contact angle. Preferably, base surface roughness is sufficiently increased such that the capillary channel base surface perimeter:base width ratio is increased to levels greater than 1.0, more preferably greater than about 1.5, most preferably greater than about 2.0. The height of ribs 7 or other surface roughness means preferably will not extend above about 20% of the width of the channel as measured at the base.

In the calculation of SCV, SCSA, or other parameters, any capillary channels that result that are contained within the cross-section area of a larger capillary channel having an $A_y$ as defined in the Test Methods for SCV and SCSA is not counted as a separate capillary channel.

The capillary channel fibers of the present invention can be utilized in their unmodified form, i.e., the form in which they are made, or can be provided in a textured forms known to those skilled in the field of synthetic textile fibers.

The fibers of the present invention can also be utilized in absorbent articles in the form of tow. Tow, as understood in the art, is a rope-like strand of a plurality of fibers in linear form, i.e., without a definite twist or curl such as in the randomly curled filaments described above. The fibers of tow are held together by tow-binding means which typically is by crimp, although other binding means such as, but not limited to, spot-bonding, fusion of the ends of the fibers to one another, external wrappings, etc., can be used.

The fibers of the present invention can also be provided in the form of yarns, textiles including woven and knit fabrics, nonwovens, etc. The fibers of the present invention can be utilized in such yarns, textiles, and nonwovens according to conventional techniques known to those skilled in the art for conventional, non-capillary channel fibers or prior known fibers with intra-fiber channels, such as disclosed in U.S. Pat. No. 4,054,709, Belitsin et al., issued Oct. 18, 1977, incorporated herein by reference.

General fiber making technology as described in *Encyclopedia of Polymer Science and Engineering*, Volume 6, pages 802–839, (1986), John Wiley and Sons (New York), incorporated by reference herein, can be employed in the manufacture of the capillary channel fibers of the present invention. In general extrusion processes, such as melt spinning, wet spinning, and dry spinning, are preferred. Melt-spinning is especially preferred for making the structures of the present invention. In general, melt spinning involves melting the polymer, applying pressure to extrude the melt through the extrusion die, and cooling and drawing the extruded structure to the desired size. Melt spinning and other spinning methods each involve the use of an extrusion die (sometimes referred to as a spinneret) which has an orifice design which roughly corresponds to the cross-sectional shape of the capillary channel structure immediately upon exit from the die. Depending upon orifice design, processing conditions, and polymer composition, and other factors known to those skilled in the art, the final cross-sectional shape of the structures can deviate from the orifice design. The extrusion die orifice design, the polymer, and temperature at which it is molten for extrusion, and processing conditions of the extruded polymer during drawing and cooling can be of importance in making the capillary channel structures of the present invention. In order for the extruded, but not yet cooled, structure to better retain its shape and capillary wall and base element dimensions relative to the capillary channel size approximate to that of the extrusion die orifice, the polymer is preferably extruded at low temperature relative to the temperatures conventionally preferred for extrusion of the particular type of polymer in conventional fiber extrusion processes. The extruded polymer is then cooled relatively rapidly during the drawing process for shape retention. It is therefore preferably that the polymer be of an amorphous character. Amorphous polymers are preferred for extrusion in the present invention, since they tend to better resist breakage upon drawing over a relatively large temperature range, particularly as temperature approaches the glass transition temperature. Whereas such polymers are commonly extruded at relatively high temperatures, to reduce viscosity of the melt and consequently facilitate higher extrusion die polymer throughput, improved shape retention of the capillary channel structures (relative to the extrusion die orifice design) can be obtained by operating at temperatures closer to the glass transition point. The optimal temperatures for extrusion will vary from polymer to polymer. Particularly good results can be obtained with KODAR ™ 6763 PETG, for example, at extrusion temperatures of about 205° C. to about 230°.

As discussed above, in preferred processes, the polymer will also be rapidly cooled upon exit from the extrusion die and during drawing. Cooling can be accomplished by radiation and convection in air in successive cooling zones, typically about 2 to about 4 successive cooling zones. Equipment suitable for performing such cooling, e.g., cooling chimneys, is well known in the of extrusion and fiber-forming arts. Preferably, the first cooling zone will be set to have an ambient temperature at least about 30° C., more preferably at least about 50° C., most preferably at least about 75° C., below the polymer as it exits the extrusion die and enters the cooling zone in order to rapidly raise the viscosity of the polymer and thereby reduce surface tension-induced reshaping of the structure.

The same type of equipment used in the melt spinning of conventional synthetic fibers can be used in the present invention, except that an extrusion die having an orifice design providing for the capillary channels, as previously described, is used. This equipment typically includes an extruder, a die block into which molten polymer from the extruder enters, and subsequently exits through an extrusion die, and means for drawing, cooling, and winding the capillary channel structure. If the extrusion die has an annular capillary channel base orifice and a central gaseous inlet orifice, as described in more detail below in connection with an improved process for making capillary channel structures, the die block is modified to allow a stream of gas to be directed through the gaseous inlet orifice of the extrusion die. This can be done by introducing air passageways e.g., tubing or piping, into the die block which allow an isolated stream of gas (e.g., air) to be fed to the gaseous inlet orifice of the extrusion die. Such designs for melting spinning are not known to have been heretofore disclosed. Die block design providing for introduction of an air stream through a center hole of a die having an annular orifice design for extrusion of conventional, non-capillary channel films and sheets is known in the art of blown film processes, albeit not in connection with capillary channel structures or dies useful for making capillary channel structures. Background on directing an air stream through a die block can be found in *Encyclopedia of Polymer Science and Engineering*, Second Edition, Volume 7, pp 107-109, John Wiley & Sons, New York, and Volume 6, pp 767-769, of the same encyclopedia, both incorporated herein by reference. Such general disclosure, although neither teaching nor suggesting the process or products of the present invention, can be applied to the extrusion die blocks of the present invention by one of ordinary skill in the art, in view of the disclosures herein.

Upon exit of capillary channel structures from an annular base orifice extrusion die design, sufficient air is introduced through the gas inlet orifice to prevent the base element from collapsing. The structures can be drawn while in such configuration and used in that form, or can be slit subsequent to drawing to provide a structure with a planar base.

Depending upon the size of the drawn structure, after it is slit, it may be characterized as either a fiber or a sheet, according to the definition provided above. If a sheet, it can be used as it, or can be further slit or cut to provide fibers, or sheets of particular shapes and designs, or split films (i.e., highly slit meshes).

Capillary channel sheets of sizes conventionally associated with the melt-extruded blown film and sheeting process, and other blown film techniques, may be adopted to the present invention by replacing the conventional film extrusion die, having a simple annular orifice design with, preferably, an extrusion die of the present invention having an annular base orifice with capillary channel wall orifices extending radially therefrom.

In extrusion processes, the extruded polymer has essentially the same cross-sectional shape as the die orifice immediately upon exit from the die. Due at least partially to surface tension effects, however, it has been observed that the still molten polymer capillary walls tend to shrink in length (i.e., shrink in wall height) and expand in thickness, thereby effectively reducing the specific volume and surface area of the capillary channel structure.

The orifice design of the extrusion die will control the shape of the capillary channel structure upon exit from the die. Thus, the extrusion die orifice should be designed in accordance with the desired capillary channel configuration. Specifically, the reduction of the ratio of capillary wall length to capillary channel width which tends to occur during drawing of the structures can be compensated for by designing extrusion die orifices with correspondingly exaggerated capillary wall length to intercapillary wall distance ratio.

It has been found that this phenomena can be compensated for by designing the extrusion die orifice such that the wall orifice length:inter-wall orifice with ratio is from about 2 to about 5 times the desired capillary channel wall height:capillary channel width ratio. The exact magnitude of shrinkage, however, will depend upon specific conditions.

The degree to which the capillary channel structures are drawn will depend upon the wall and base thicknesses of the extruded polymer immediately upon exit from the extrusion die orifice and the desired base and wall thicknesses of the final product. In general, however, the extrusion-draw ratios hereof will typically be at least about 100:1, more typically from about 1,000 to about 10,000 and preferably from about 1,000 to about 5,000. The use of polymers that have good cohesive strength in the molten state is desirable in view of these relatively high draw ratios. Thus, in general, polyester-based and nylon polymers will often be preferred over less cohesive materials such as polyolefins.

FIG. 7, 8, 9, and 10 show direct views of extrusion dies 20 having extrusion die orifices 22 which can be utilized in the manufacture of capillary channel structures of the present invention. The extrusion die orifices 22 have capillary channel base orifices 30 which upon extrusion will provide a capillary channel base of a planar geometry, capillary wall orifices 28 extending from the base orifices 30. As discussed above, it is the nature of the present invention that capillary structures have high specific capillary surface area and volume which translate, of course, to thin capillary channel walls and bases. Whereas the extrusion die orifices of FIGS. 7, 8, and 9 can provide effective capillary channel structures within the scope of this invention, the capillary channel walls of the structures formed from such extrusion die orifices tend to deflect in alignment, or distort, upon drawing to the relatively high draw ratios and fine deniers preferred herein. Although not intended to limit the invention by theory, by way of explanation, it is believed that this distortion is due to tangential stresses in the cross-section that occur during drawing of the structure. Such deflection of channel walls results typically in a fishbone-type configuration as exemplified by the photomicrograph of FIG. 18. With the foreknowledge that such fishboning will typically occur for capillary channel structures made from extrusion dies of the type shown in FIGS. 7, 8, and 9, the extrusion die orifice can be modified, as in FIG. 10, to take into account that the drawn capillary channel structure will not typically have capillary channel walls which are perpendicular to the base. By providing a extrusion die orifice design where the capillary channel wall orifices are similarly situated at angles corresponding to those toward which the capillary channel walls would tend to deflect upon drawing if the wall orifices were perpendicular to the base, it is believed that capillary channel wall parallelism can be better attained. The capillary channel walls orifices 28 in FIG. 10 extend from one side of the capillary channel base orifice 30. Alternately, capillary channel wall orifices can extend from both sides of the base orifice.

Figure 9:
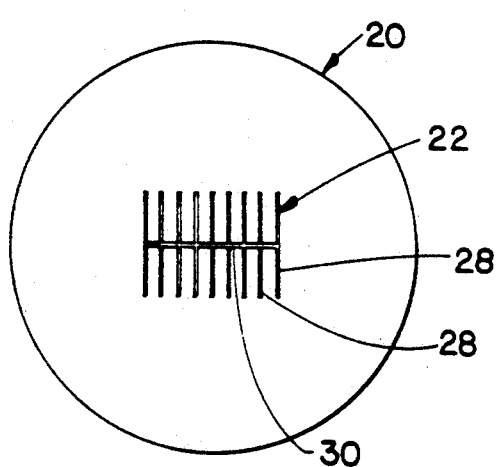
FIG. 9 is a direct view of an extrusion die having an orifice design suitable for making capillary channel fibers having a planar base and capillary channel fibers having a planar base and capillary channels, of consistent width, on both sides of the base.
Figure 10:
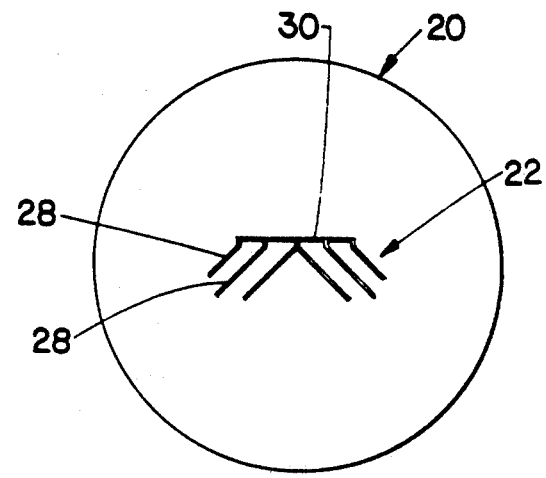
FIG. 10 is a direct view of an alternative extrusion die having an orifice design suitable for making capillary channel fibers having a planar base and capillary channels on one side of the base.

It is further noted, in FIG. 8, that capillary channel wall orifices are designed to provide capillary channel widths upon extrusion of varying size. FIGS. 8 and 9 show capillary channel orifice designs having linear bases 30 from which extend capillary channel wall orifices from each side of the base orifice 30.

Figure 11:
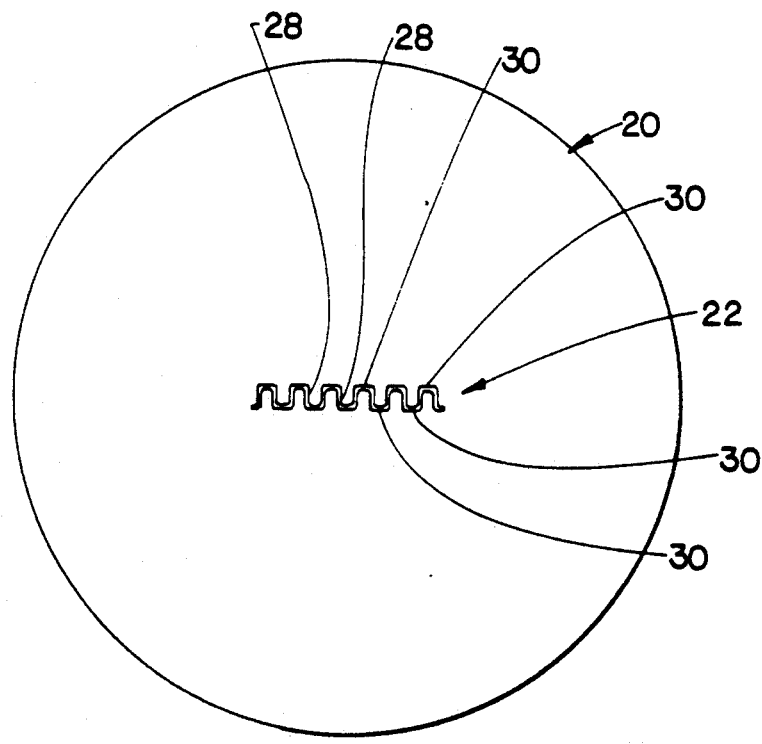
FIG. 11 is a direct view, with an expanded view for a portion thereof, of an extrusion die having an orifice design suitable for making capillary channel fibers having rounded interior bases and also having capillary channels that are open on alternating sides of the fiber.

FIG. 11 shows an extrusion die 20 having capillary channel orifice 22 having a plurality of capillary channel base orifices 30 connected by capillary channel wall orifices 28 such that a capillary channel structure extruded from such extrusion die 20 has capillary channels which are alternately open on opposite sides of the structure. As shown in FIG. 11, the capillary channel wall and base orifices 28, 30 are designed to provide a U-shaped capillary channel design. It should be understood that such U-shaped capillary channel designs are not limited to the extrusion die orifice design of FIG. 11.

Figure 15:
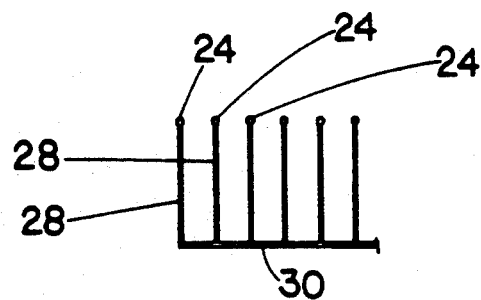
FIG. 15 is a direct view of a portion of an orifice design of an extrusion die showing diverticula at the end of capillary channel wall orifices distal to the capillary channel base orifice.

FIG. 15 shows a drawing of a portion of an extrusion die orifice having base orifice 30, capillary channel wall orifice 28, and diverticulum 24 at the distal ends of capillary channel wall orifices 28. Diverticulum are larger in diameter than the width than the wall orifices, typically about 50% greater in diameter than said wall orifice width. Diverticulum are preferably incorporated into the extrusion die design. Although not intended to limit the invention thereby, it is believed that the incorporation of such diverticulum in the extrusion die orifice design can provide more uniform polymer flow through the die.

The width of the maximum cross-sectional diameter of the extrusion die orifice design can vary widely. However, it has been found that widths of about 1.0 cm to about 5.0 cm are useful. The widths of the capillary channel wall orifices and base orifice can also vary widely. Wall and base orifice widths of about 50 microns to about 200 microns will typically be used, with preferred wall orifice from widths of from about 75 microns to about 150 microns. The depth of the extrusion die orifice in the direction parallel to axial flow of the polymer can also vary, however depths of from about 0.2 cm to about 0.4 cm can typically be used.

In an improved process for making capillary channel structures, which is provided herein, improved retention of capillary channel shape can be obtained between extrusion and completion of drawing of the capillary channel structure. Such process comprises:

(a) feeding a flowable, molten polymer composition through a capillary channel orifice of an extrusion die wherein the extrusion die has a capillary channel orifice characterized by an annular base orifice from which a plurality of capillary channel wall orifices radially extend such that the polymer composition upon exiting said extrusion die comprises a hollow annular base and a plurality of capillary channel walls extending radially from said base, said base and said walls forming a plurality of capillary channels, and wherein said extrusion die has a gas inlet port located within the interior of said annular base orifice;

(b) simultaneously with feeding said polymer composition through said extrusion die's capillary channel orifice, feeding a gaseous stream through said gas inlet port in the same direction as the flow of said molten polymer composition; and (c) subsequent to exit of the polymer composition from the extrusion die, drawing the capillary channel structure to a desired size and cooling said structure;

whereby said gaseous stream inhibits collapse of said annular capillary channel structure during cooling and drawing of said structure.

The extrusion dies, as described in the above process, are also provided as an aspect of this invention. In particular, such die comprises an extrusion die, said die comprising a capillary channel orifice layer, said layer having an annular base orifice from which a plurality of capillary channel wall orifices radially extend, said capillary channel orifice layer further having an interior region and an exterior region relative to said annular base orifice, a gas inlet port disposed within the interior region of said annular base orifice, and means for fixably maintaining said interior region in place, relative to said exterior region.

By annular base orifice, what is meant is a base orifice which is of a continuous ring-type design, without flow interruption around its circumference, having a nominally circular geometry. The base orifice need not be exactly circular. However the ring designs preferably are essentially symmetrical about the X and Y axis.

The flow of gas through the gas inlet port should be metered at a ratio such that the annular base, upon exit from the extrusion die and during drawing, does not collapse prior to cooling below the glass transition temperature of the polymer. Early collapse can lead to fusing of the annular base to itself, and also will eliminate the annular geometry, thereby leading to wall shape distortion. Additionally, the gas flow rate should be sufficiently low such that it allows the annular base to contract during drawing. The precise flow rate will, of course, vary with process conditions. However, appropriate flow rates can easily be determined by observing the extruded polymer in the drawing operation and the final product, and adjusting the flow of gas consistent with the above criteria.

Figure 18:
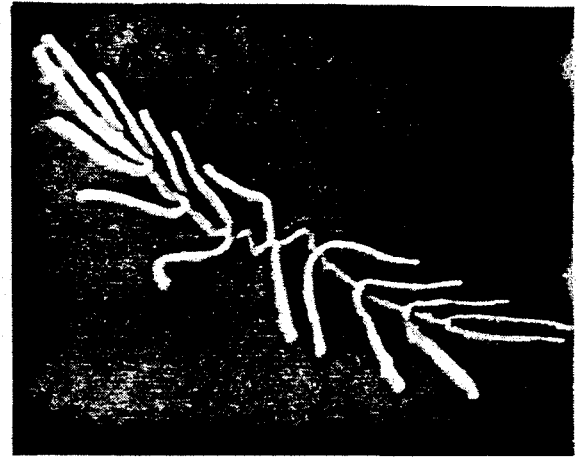
FIG. 18 is a photomicrograph (195X) of a capillary channel structure cross-section.

Although it is not intended to limit the invention by theory, it is believed that the annular capillary channel base which exits from the annular base orifice design subjects the capillary channel walls to radial stresses without appreciable tangential stresses. This can result in high degrees of shape retention. Such improved results are exemplified by the photomicrographs shown in FIGS. 19, 20, 21, and 22. FIG. 18 is a photomicrograph of a capillary channel fiber made from an extrusion die having a non-annular base orifice, of the general type shown by FIG. 9.

Figure 12:
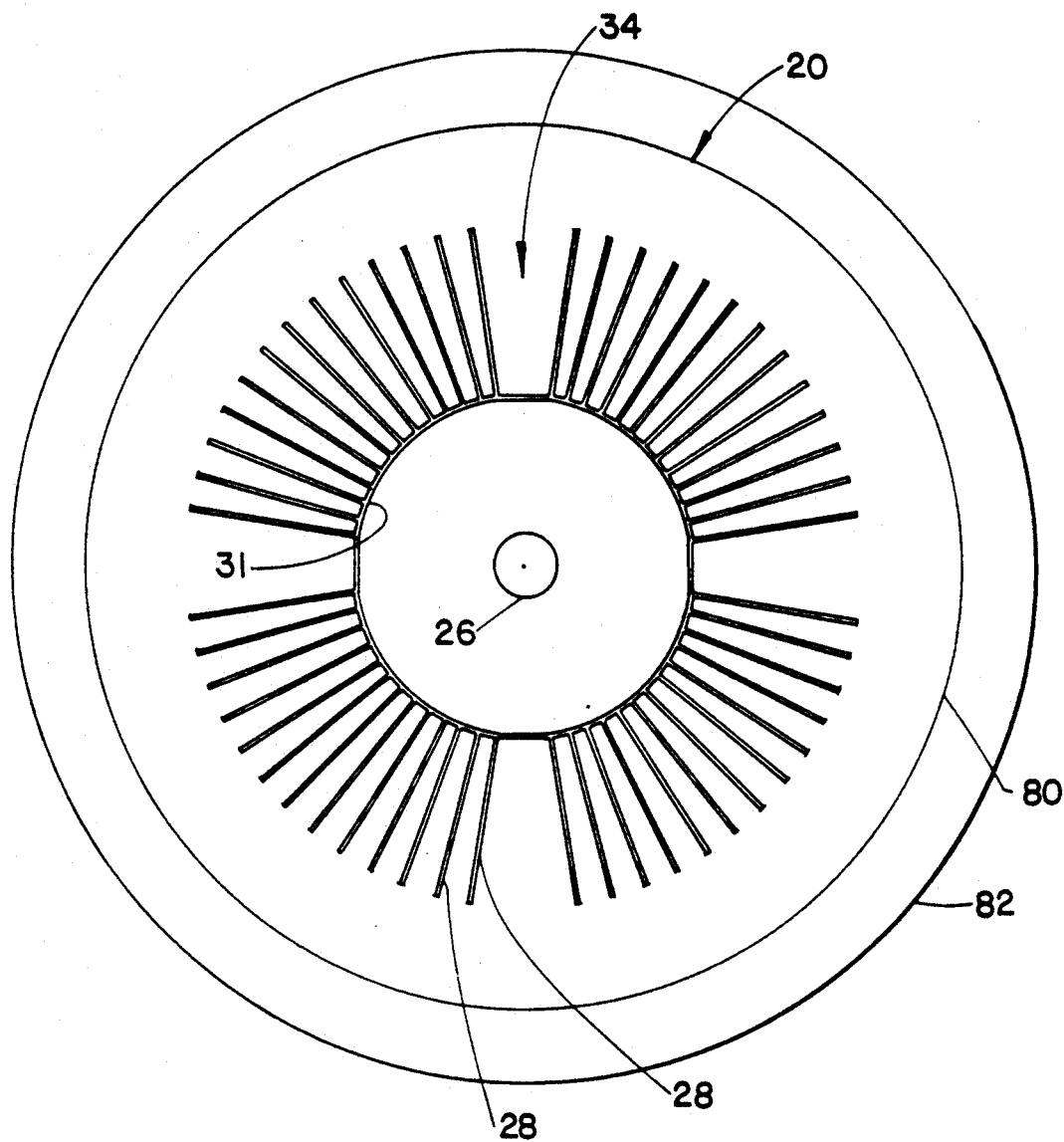
FIG. 12 is a direct view of an extrusion die having an orifice design wherein the capillary channel base orifice is annular in design and the capillary channel wall orifice is extended radially outward therefrom.
Figure 13:
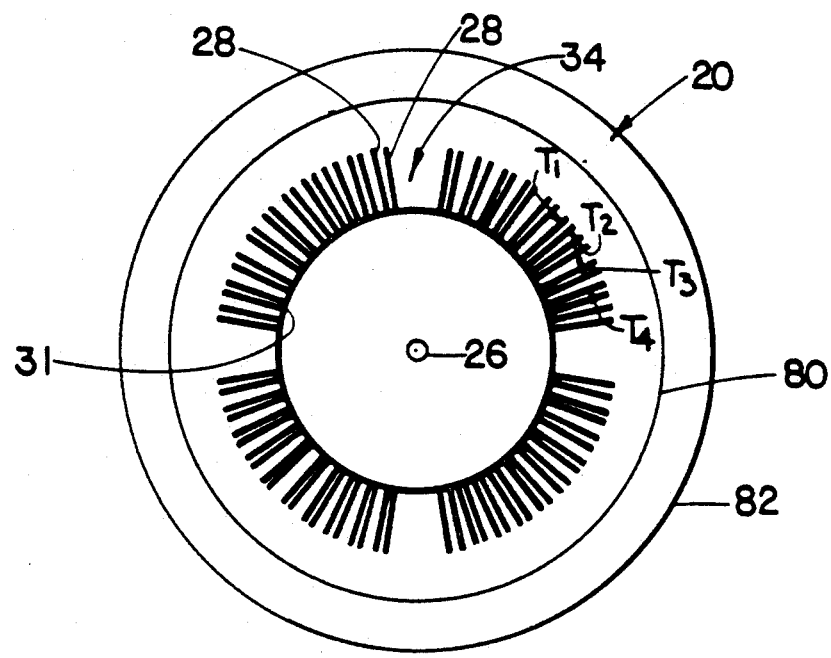
FIG. 13 is a direct view of an extrusion die similar to that of FIG. 12 except wherein the capillary channel wall orifices are designed to provide capillary channels of alternately varying width.
Figure 14:
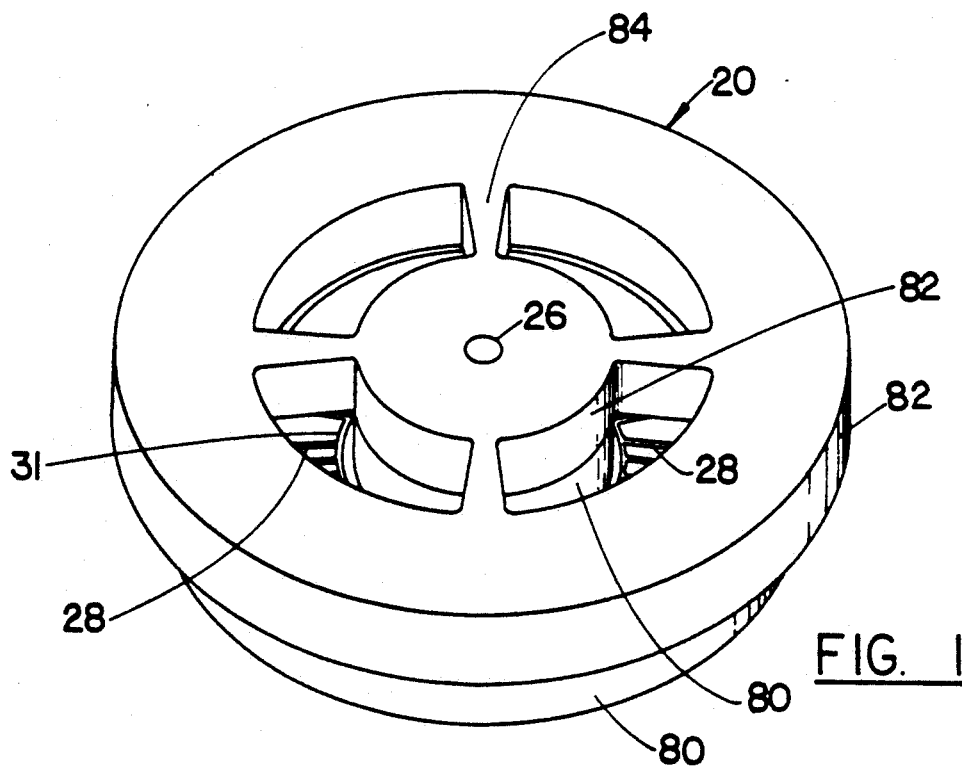
FIG. 14 is a reverse, perspective view of an extrusion die having an annular capillary channel base orifice.
Figure 16:
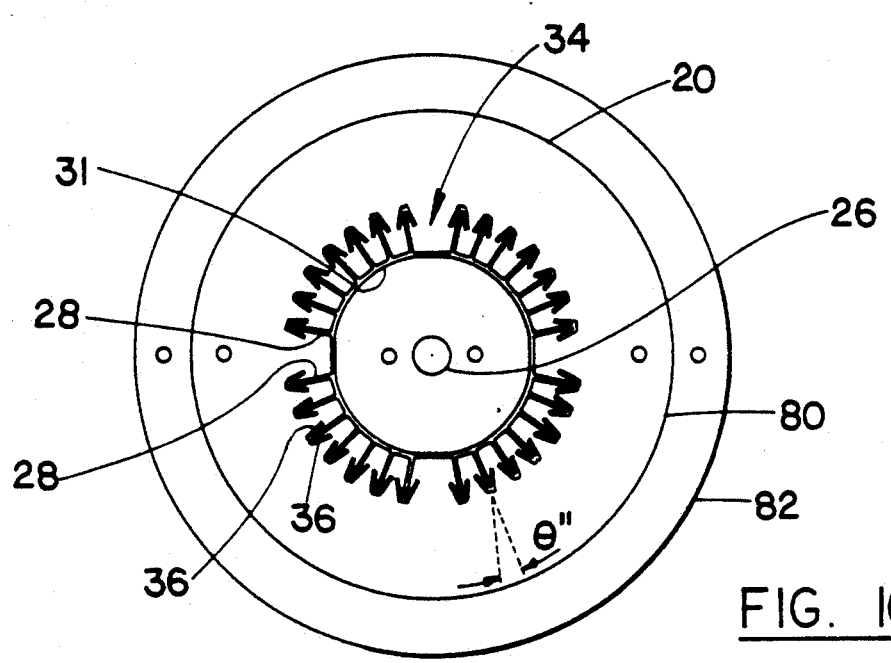
FIG. 16 is a direct view of an extrusion die having a capillary channel base orifice design of annular shape wherein the capillary channel wall orifices extending radially outward therefrom are modified to provide bottle-shaped capillary channels in the capillary channel structures made from such extrusion die.

Extrusion dies 20 having annular base orifices 31 are exemplified in FIGS. 12, 13, and 16. Each of these figures is further characterized by capillary channel wall orifices 28 extending radially outwardly from the base orifices 31. The capillary channel wall orifices can be primarily of consistent distances apart as shown in FIGS. 12 and 16, to provide capillary channel structures wherein the capillary channels are primarily of substantially the same width. Alternatively, the capillary channel wall orifices 28 can be of varying distances apart from adjacent wall orifices to provide a capillary channel structure having capillary channels as previously discussed and is also shown in FIG. 13, wherein the capillary channel wall orifices 28 have alternately different spacing, as exemplified by the spacing between wall orifices $T_1$ and $T_2$, and between wall orifices $T_2$ and $T_3$. Each of FIGS. 12, 13, and 16 are characterized by strut regions 34. The reason for such strut regions 34 is practical in nature rather than required for any theoretical or product performance oriented reasons. These practical reasons are apparent from FIG. 14 which shows a perspective view from the polymer-approach side of an extrusion die having an annular orifice design. FIGS. 12, 13, and 16 also show support layer 82, extrusion die orifice layer 80, which are discussed in more detail in connection with FIG. 14. As shown in FIG. 14, extrusion die 20 comprises extrusion die orifice layer 80 fixably attached (such as by brazing) to extrusion die support layer 82 having internal struts 84. The orifice layer 80 must be attached to the support layer 82 at regions both outside of annular base orifice 31 and inside of annular base orifice 31. This is necessary in the exemplified extrusion die, because annular base orifice 31 is circumferential in design and would not otherwise remain securely in place. The annular base and wall orifices can be machined by electrical discharge machining after the layers are brazed. Also shown are capillary channel wall orifices 28 and gas inlet port 26.

Extrusion dies 20 shown in FIGS. 12, 13, and 16 additionally have gas inlet ports 26 through which gases, or gaseous mixtures, such as air can be introduced to the interior portion of the annular base of a capillary channel structure upon exit from the annular base orifice extrusion die.

Referring specifically to FIG. 16, capillary channel wall orifices 28 have capillary channel wall orifice extensions 36 extending from the end of the walls 28 distal to the annular base orifice 31. These wall extension orifices 36 preferably extend at a radially inward angle $\theta''$ (i.e., toward the annular base orifice 31) of from about 5° to about 30° more preferably from about 10°0 to about 20°. Such orifice design has been found to be useful for making tapered capillary channel shapes as shown by the drawing of FIG. 17 and the photomicrograph of FIG. 21. The polymer flowing through the wall extensions 36 form capillary channel wall extensions (see FIG. 17, element 38, 38'). Upon drawing, the wall extensions are believed to be subjected to radial stresses which cause the wall extension angle to shift from a radially inward direction to a radially outward direction.

TEST METHODS

The following procedures are useful for determination of parameters used to define and evaluate the capillary channel structures of this invention. The procedures may require preparation of structures of varying lengths, some of which may exceed the length of the structure actually intended for use. It is to be understood that any structures shorter than lengths required by the procedures are evaluated on the basis of equivalent structures having the requisite lengths set forth in such procedures, except as may be otherwise specifically provided. Specific units may be suggested in connection with measurement and/or calculation of parameters described in the procedures. These units are provided for exemplary purposes only. Other units consistent with the intent and purpose of the procedures can be used.

Specific Capillary Surface Area and Volume Procedure

This procedure is used to determine Specific Capillary Surface Area (SCSA) and Specific Capillary Volume (SCV) of a capillary channel structure. The procedure is applied to a photomicrograph which shows a representative cross-section of the capillary channel structure. The cross-section of the structure is prepared for photomicrographing by embedding and microtoming techniques known to those skilled in the art. The following equations are used:

$$SCSA = \frac{\sum_{x=1}^{i} P_x}{\rho A_s} \quad (1)$$

$$SCV = \frac{\sum_{x=1}^{i} Av_x}{\rho A_s} \quad (2)$$

wherein:

$\rho$ = density of the solid (i.e., polymer);

$A_S$ = area of the cross-section of capillary channel solid perpendicular to the capillary channel axis which bounds those capillary channels within the scope of criteria (a) and (b), below;

$$\sum_{x=1}^{i} P_x =$$

the sum of the perimeters of the cross section of the solid forming each of the capillary channels, x, wherein each perimeter $P_x$ bounds the capillary channel and is within the theoretical closure provided by $C_x$;

$$\sum_{x=1}^{i} Av_x =$$

the sum of the void areas of the capillary channel structure wherein each $Av_x$ is calculated as the area bounded by the perimeter of the solid forming the channel and by $C_x$; and wherein i is the number of capillary channels in the structure, x refers to specific capillary channels of a capillary channel structure, and $C_x$ corresponds to that part of a circle which is convex toward the interior of the channel and which is of a selected diameter that closes each capillary channel, x, wherein the circle, $C_x$ is sized and positioned according to the following criteria:

(a) the circle, $C_x$, is tangent to both walls of the capillary channel, x, at the points where it meets the walls; and (b) for each capillary channel, x, the circle $C_x$ meeting (a) maximizes $Av_x$ for each such channel, x, subject to the limitations that:
  (i) the lines tangential to the intersection of $C_x$ and the capillary channel walls intersect to form an angle of 120° or less; and
  (ii) $C_x$ can have a radius of no greater than about 0.025 cm with respect to the actual scale of the capillary channel structure (circle radius will be enlarged by the same magnification factor applied to the actual structure in the photomicrograph).

For capillary channel structures have capillary channel wall fluid exchange orifices, the effect on SCV and SCSA will generally not be of numerical significance due to the thin walls of the capillary channel structures hereof, and can generally be disregarded in the calculations.

For capillary channels having multiple points of tangency with a circle of maximum radius, as provided above, the circle is positioned so as to maximize cross-sectional area (Av) of the channel. For capillary channel structures having variation in cross-sectional size or shape, sufficient cross-sections can be evaluated to provide a representative weighted average SCV and/or SCSA. If, however, any portion of the structure of linear length (in the axial direction of the capillary channels) of at least about 0.2 cm, preferably at least about 1.0 cm, has a SCV and SCSA within the claimed ranges hereof, that such structure is said to comprise a capillary channel structure of the present invention. Preferably, at least about 50%, more preferably at least about 75%, most preferably essentially 100% of the axial length of the structure will fall within the SCV and SCSA hereof.

For capillary channel sheets, particularly those with capillary channel bases of relatively large width, a representative sample of the product having a fraction of the total width of the base can be substituted in place of the entire cross-section of the sheet. Such fractional sample of the sheet preferably has a width of at least about 0.5 cm. The purpose of SCV and SCSA, as defined above, is to provide quantitative analysis of structures characterized by open capillary channels. It is conceivable that such structures can have solid portions, appendages, and the like, which do not otherwise contribute to the definition of the capillary channels in this procedure. The above criteria will exclude perimeter and void areas corresponding to such nonfunctional portions of the structure from the calculations. Also, the cross-sectional area of nonfunctional solid elements is not to be included in the calculation of $A_s$. Exclusion of such perimeters and cross-sectional area is exemplified in more detail below.

Figure 24:
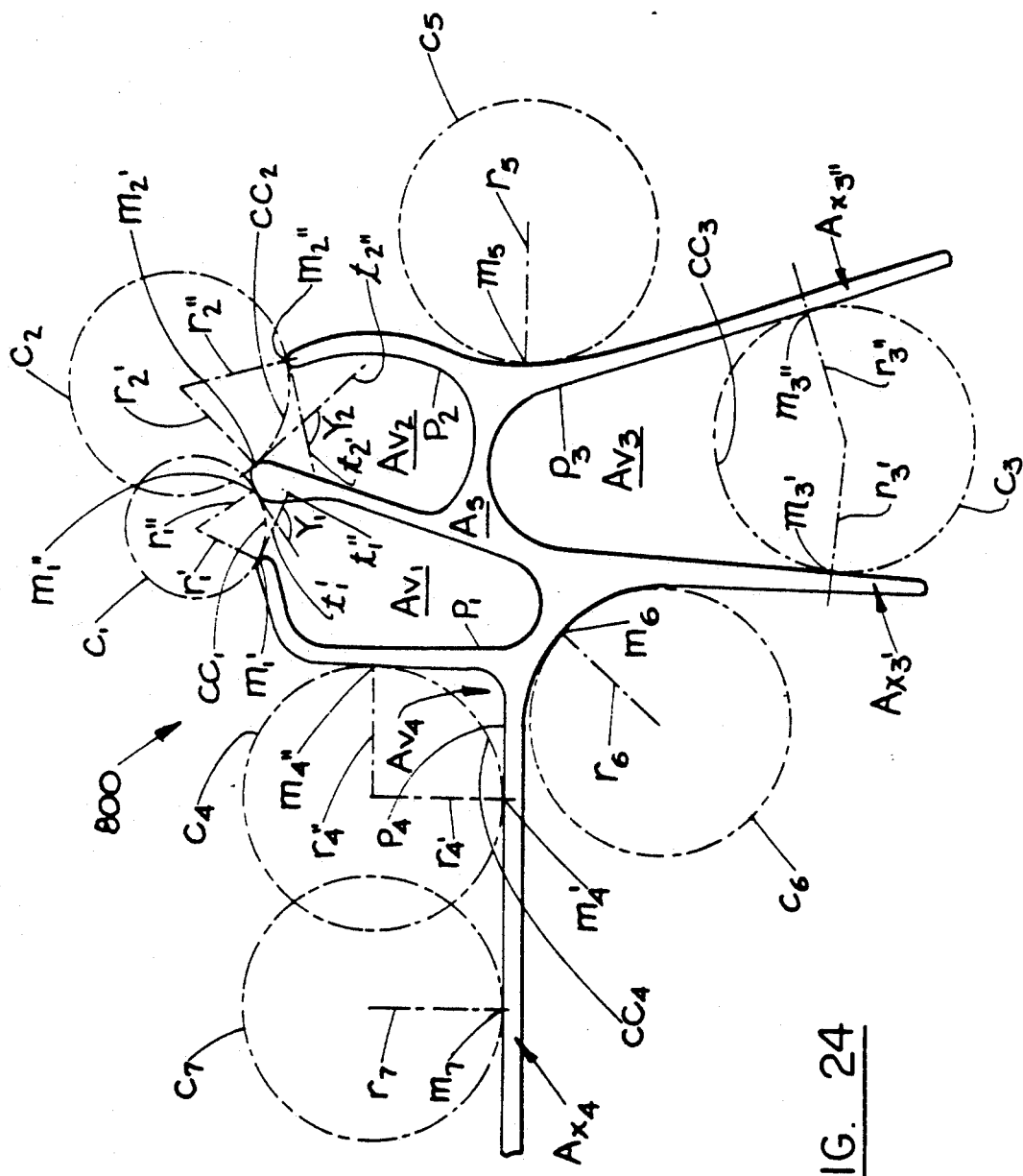
FIG. 24 is a cross-sectional view of a capillary channel structure which exemplifies various aspects of procedures for calculating Specific Capillary Volume and Specific Capillary Surface Area.

FIG. 24 exemplifies a capillary channel structure fragment 800 and application of the SCV and SCSA procedure thereto. Shown is the fragment 800 of solid (i.e., polymer) having area $A_s$, capillary channel void areas $Av_1$, $Av_2$, $Av_3$, $Av_4$, with corresponding capillary channel perimeters $P_1$, $P_2$, $P_3$, $P_4$ and theoretical closure circles $C_1$, $C_2$, $C_3$, and $C_4$. Also shown are circles $C_5$, $C_6$, $C_7$. Radii $r_{1'}$, $r_{1''}$, $r_{2'}$, $r_{2''}$, $r_{3'}$, $r_{3''}$, $r_{4'}$, $r_{4''}$, $r_5$, $r_6$, $r_7$ are each perpendicular to the line tangent to the points of intersection $m_{1'}$, $m_{1''}$, $m_{2'}$, $m_{2''}$, $m_{3'}$, $m_{3''}$, $m_{4'}$, $m_{4''}$, $m_5$, $m_6$, $m_7$, respectively, between the corresponding circles, $C_1$, $C_2$, $C_3$, $C_4$, $C_5$, $C_6$, $C_7$ and the solid material of fragment 800.

The circles $C_1$, $C_2$, $C_3$, and $C_4$ are drawn so as to meet the above criteria. As can be seen circles $C_1$ and $C_2$ are limited in radius $r_1$, $r_2$ by angles $\gamma_1$, $\gamma_2$ which represent 120° angles of intersection between tangent lines $t_{1'}$, $t_{1''}$, and between $t_{2'}$, $t_{2''}$, respectively. $Av_1$, $Av_2$, $Av_3$, and $Av_4$ are the areas bounded by perimeters $P_1$, $P_2$, $P_3$, and $P_4$, and curves $cc_1$, $cc_2$, $cc_3$, and $cc_4$, respectively. Circles $C_3$ and $C_4$ represent the maximum size circle for capillary channels, wherein the angle of intersection of lines drawn tangent to the circle at points $m_{3'}$, $m_{3''}$ and at $m_{4'}$ and $m_{4''}$, respectively, would be less than 120°. Thus, as represented in this exemplary figure, circles $C_3$ and $C_4$ would each have radius of 0.025 cm, after reduction for magnification effects. Perimeters are determined as the length of the solid boundary interior to the channels between the points of intersection between the circle and the solid for each channel. $C_5$, $C_6$, and $C_7$ represent circles of maximum radius applied to portions of the structure which do not qualify as capillary channels according to the criteria of this procedure. Hence, P and Av for these circles would be zero. As can be seen, the area of the solid between $m_{4'}$ and $m_{4''}$ would be included within $A_s$ since such solid corresponds to capillary channel walls bounding channels within the criteria for Av in the calculation of SCV and SCSA. Areas $A_{x3'}$ and $A_{x3''}$, which are bounded by linear extensions of the radii $r_{3'}$, $r_{3''}$, (said radii being perpendicular to the line of tangency between the circle $C_3$ and the walls of the channel), are not included in $A_s$. Likewise, radius $r_{4'}$ truncates area $A_{x4}$ from the calculation $A_s$ based upon extension of $r_{4'}$ of circle $C_4$.

Capillary Sorption Procedure

The following procedure is used to determine equilibrium intra-structure capillary sorption of capillary channel structures. This procedure is applied to single capillary channel fibers, or single strips cut from capillary channel sheets wherein the strips are cut to widths of about 0.5 cm wide or less. Such strips are cut from the sheet in the direction parallel to the capillary channels. If the capillary channel sheet has varying capillary channel size, shape, or other varying parameter across its width, a plurality of strips sufficient to provide a representative weighted average Capillary Sorption value can be evaluated. Alternately, the entire sheet can be cut into strips of equal width and then evaluated and averaged to provide the Capillary Sorption of the sheet. If any portion of the sheet having a width of at least about 0.5 cm, preferably at least about 1.0 cm, has an averaged Capillary Sorption within the limitations for Capillary Sorption hereof, that sheet is said to comprise a capillary channel structure of the present invention.

A balance having a sensitivity of at least about 0.0002 g and having the capability of weighing samples suspended beneath it, such as a Mettler AE200 Balance (available from Mettler Instrument Co., Hightstown, N.J., USA), is positioned on the top surface of a weighing table above a hole drilled through the top surface of the table. A wire is suspended from the weighing mechanism of the balance and extends through the hole in the weighing table. The wire is equipped with a non-absorbent clamp means below the top surface of the weighing table for securing the end of a capillary channel structure (hereafter "sample") to the wire. A pair of tweezers with a rubber band for locking the tweezers in a closed position about the sample, or equivalent, can be used as clamp means.

In the event that the sample has a hollow core, both ends of the sample must be sealed to prevent capillary fluid flow through the core. This can be done by fusing shut the end of the sample which is later immersed in the test fluid. A hydrophilic fabric is wetted with fluid and partially immersed in its own reservoir. The hydrophilic fabric reservoir contains the same type of fluid as the test fluid of the sealed base, but the two reservoirs are distinct, such that the hydrophilic fabric does not contact the liquid test fluid into which the test sample will be partially immersed. Prior to beginning this procedure for sample capillary sorption evaluation, the hydrophilic fabric is positioned as described below for at least about 60 minutes, to allow the tube interior humidity to equilibrate. Upper and lower telescoping glass tubes, or equivalent, are disposed vertically beneath the weighing table and centered around the hole in the top surface of the weighing table to inhibit evaporation of the test fluid. The interface between the upper tube and the weighing table is sealed with an O-ring. The lower tube is of slightly smaller diameter than the upper tube, such that it can vertically slide when at least part of it is disposed inside the upper tube. The juncture between the upper and lower tubes is slideably sealed with a second O-ring. At the bottom of the lower tube is a sealed base suitable for containing fluids without leakage. To determine capillary sorption of water, distilled water should be used as the test fluid. To determine capillary sorption for oleophilic structures hereof, n-decane can be used. The sheet of hydrophilic fabric (e.g., VISA TM polyester fabric, Milliken & Co., Spartanburg, S.C., USA, or equivalent) is wrapped against the inside surface of the lower tube, and secured in place with the bottom of the sheet immersed in the fluid of the hydrophilic fabric reservoir. The following tube and hydrophilic fabric dimensions are useful, but other tube sizes which provide corresponding results may be used: Upper tube—40 cm in length with a 5.9 cm inside diameter; lower tube—33 cm long with a 5.8 cm outside diameter; hydrophilic fabric—about 30 cm×about 10 cm. A jackstand is placed beneath the lower tube to support the tube in a desired vertical position.

Prepare a series of capillary channel structure samples to be tested of lengths of 2.0, 3.0, 4.0, 5.0, 7.5, 10.0, 15.0, 20.0, 25.0, 30.0, 35.0, and 40.0 cm. with respect to each sample, securely attach a lead bead (at least about 0.2 grams), or equivalent, to one end of the sample. With respect to lead beads, said beads can be attached by making a transverse slit in the bead extending to about one-half of its diameter, and crimping the bead onto the sample, with approximately 1 mm of an end of the sample crimped inside the lead bead. Approximately 1 mm portion of the sample at the other end is secured to clamp means (described above) and suspended from the balance by the wire. Position the upper and lower tubes to encompass the region surrounding the suspended sample from the base to approximately 1 to 2 centimeters from the bottom surface of the weighing table. Test fluid is provided in the sealed base of the lower tube. Position the sample just above the test fluid in the base such that the sample touches neither the test fluid nor the sides of the tubes. Determine and record the dry weight of the sample and lead bead ($W_1$). Raise the jackstand until the top of the lead bead is immersed to just below the fluid surface. The upper tube is raised until it contacts the underside of the weighing table with its O-ring contact. The second O-ring is slid upward on the lower column until it contacts and supports the upper tube. The fluid is allowed to wick up each sample until equilibrium is substantially reached. Typically, a period of two minutes per 1.0 cm of sample length is sufficient. However, the equilibrium time can vary either above or below such amount. The jackstand is then lowered until the lead bead, in its entirety, clears the test fluid and the total weight of the fluid absorbed, the sample and the bead is measured and recorded ($W_2$). This test is run for each sample length.

A graph of weight of fluid uptake ($W_f W_2 - W_1$; (g)) as a function of sample length (cm) is prepared. Additional sample lengths and replicates should be prepared and tested to supplement the data base as may be appropriate for good laboratory practice. A curve is fit to the data points using an appropriate numerical differentiation curve fitting technique, as described, for example, in Perry's Chemical Engineers' Handbook, 6th edition, edited by D. W. Green, McGraw-Hill Book Co., New York (1984), at pp 2-65 through 2-66. The curve is differentiated at points corresponding to the sample lengths. This gives incremental fluid weight ($dW_f/dL$) as a function of sample length (cm), which also essentially corresponds to the height of the fluid increment above the reservoir. Divide each $dW_f/dL$ (g/cm) by both average capillary channel structure linear density (g/cm) and by fluid density (g/cm$^3$), to obtain absorbent capacity (in cm$^3$ of fluid absorbed per gram of capillary channel structure) as a function of capillary suction (height of fluid (cm)). Plot absorbent capacity (cm$^3$/g) as a function of capillary suction (height (cm) of fluid). A curve is fit to this plot using a nonlinear regression curve fitting technique as described in *Perry's Chemical Engineers's Handbook*, 6th edition, at pp 2-107 through 2-113. From this Capillary Sorption curve, absorbent capacity can be read at particular levels of capillary suction.

Vertical Wicking Rate Procedure

This procedure is used to determine intra-structure Vertical Wicking Rate for capillary channel structures. In general, the purpose of the procedure is to visually observe and record the vertical position of fluid as it wicks up the capillary channels. The procedure is applied to capillary channel fibers, or slices of capillary channel sheets as described above in connection with the Capillary Sorption Procedure. The test fluid is dyed to facilitate measurements. The fluid to be used for evaluation of vertical wicking ability of aqueous solutions is distilled water dyed with 0.05% FD&C Blue #1 (hereinafter "Dyed Distilled Water"). Suitable FD&C Blue #1 dye is commercially available (e.g., from H. Kohnstamm & Co., Inc., NY, N.Y., USA).

Unless otherwise specifically indicated, this procedure is applied to single (or "individual") fibers or single slices of sheets. However, this procedure may also be adapted for measurement of vertical wicking rate and distance of bundles of fibers and/or slices of sheets. Also, as described in the Capillary Sorption Procedure, lead beads, or equivalent, are used to weight the samples of capillary channel structures and hollow core samples are sealed (e.g., fused) at their ends.

A closed bottom glass tube of approximately 5.0 cm inside diameter by 25 cm height is provided. Sufficient test fluid is added to provide a depth of about 2.5 cm. A circular plate with three, approximately 3 cm legs is inserted into the bottom of the tube with the legs resting on the bottom of the tube. The purpose of the plate is to serve as a reflection shield. A 1.3 cm circular hole is drilled in the center of the plate. A ruler marked in millimeters is attached to the outside of the tube. A rubber stopper is provided to close the top of the tube. The stopper has a centrally positioned hole to allow clamp means, for suspending a sample in place below the rubber stopper, to be inserted into the tube. The hole is sized such that the tweezers, or other clamp means as may be applicable, remain in a locked position when disposed within the rubber stopper hole. Tweezers can be used as clamp means. Clamp means must fit into the hole in the rubber stopper so as to allow for adjustment in height of the sample.

To initiate the procedure, a sample of capillary channel structure of about 24 cm in length, with a lead bead clamped onto about 1 mm of the sample at one end, is suspended by the clamp means from the other end such that the top of the lead bead is submerged and a timer is started. The time required for the fluid to reach each 0.5 cm height increment is recorded. A low power microscope may be used to aid tracking of the fluid up the sample.

Vertical Wicking Rate can be determined by preparing a plot of fluid height versus the square root of time to achieve that height.

This procedure can also be applied to bundles of the capillary channel fibers.

Compressive Strength Procedure

This method describes a procedure that is used for determining wet and dry Compressive Strength for single capillary channel fibers and sheets (hereinafter "samples"). In general, this procedure involves determination of the reduction in thickness of the structure as weight loaded on the structure is increased. Samples are pressed between a pair of self-aligning, horizontal, rigid plates. These plates should be made of stainless steel or other rigid, non-corrosive metal, and should have precision-ground mating surfaces. Weight is applied to the plates and the thickness reduction is measured. If fibers, as opposed to sheets, are being tested, two of the fibers are parallel-mounted between the plates sufficiently spaced apart to prevent tilting of the plates upon application of weight or pressure. Sheets of capillary channel structures, depending upon width, are parallel-mounted as appropriate. The bottom plate of the pair of self-aligning rigid plates has three rigid legs of equal length mounted in a tripod configuration to provide stability. The upper plate has a metal (e.g., steel) ball of about 1.5 cm in diameter fixably mounted at its center on the top of the plate. A bottom, mounting plate of the dimension 5 cm×5 cm×1 cm (thick) with 0.3 cm length legs and a top plate of the dimensions 2.5 cm×2.5 cm×0.5 cm (thick) can be used in the test. Other sizes, material, etc. can be used as long as equivalent results are obtained. The weight of the upper plate and force inherently applied by the dial indicator are measured and recorded prior to testing.

The equipment used includes the following: Ames Model 87-025 thickness gauge (available from B. C. Ames Co., Waltham, Mass., USA), or equivalent; Ames Model 452 Dial Indicator with a spindle extending both above and below the indicator gauge; the upper portion of the spindle is suitable for mounting additional weight; at the bottom of the portion of the spindle extending below the gauge is a 1.0 square inch (6.45 cm$^2$) spindle plate; the Dial Indicator is adjustably mounted to the stand of the thickness gauge. The Model 452 Dial Indicator or alternate indicator used is readable to at least approximately 0.0001 inch (approximately 0.00025 cm). The capillary channel structure samples tested should be approximately 5 cm in length, although shorter samples can be substituted based upon availability. If structure lengths of less than 5 cm are to be used in produce application, the structure can still be tested at longer length, and testing lengths of 5 cm are preferred for ease and convenience of mounting. The samples are mounted on the bottom mounting plate. Mounting of the samples can be done with cellophane tape. The sample(s) should be mounted in a substantially straight, untwisted condition and should lie flat on the mounting plate. Textured materials should be tested prior to texturing. The tape should be outside the area of the upper plate and should not contact the upper plate at any time during the test. Preferably, no portion of the tape is less than 0.5 cm from the upper plate. In the case of parallel-mounted samples, the samples should be mounted 1.5 cm apart, each 0.75 cm from the center of the mounting plate. In the case of single sheets, the sheet should be centered over the center of the mounting plate. The sample(s) are mounted such that the capillary channel base, if planar, is parallel to the plane of the mounting base. If the capillary channel structure's base is cylindrical, or other shape, the structure can be mounted at any geometrical orientation at which it will naturally lie. The compressibility of structures having capillary channels on one side, or both sides, of structures with planar bases as well as structures having capillary channel walls extending radially from the entire circumference of a cylindrical core can be determined by this procedure. After the samples(s) are mounted, the mounting base is centered under the spindle plate. The upper plate is then centered and over the mounting base, to rest on the mounted sample(s), with the attached metal ball facing upward and centered directly under the spindle plate.

Thickness of the sample(s) is measured by slowly lowering the dial indicator spindle and spindle plate toward the ball of the metal cover plate until the spindle plate contacts the ball. After 30 seconds have elapsed subsequent contact between ball and spindle plate, to allow for equilibration, thickness is recorded. The spindle and spindle plate are then raised to disengage the spindle plate from the metal ball. Thickness measurement is repeated, with incrementally increasing amount of weight added to the spindle after the spindle plate has been disengaged from the metal ball. The amount of weight incrementally added may vary depending upon the compressive strength of the sample(s), but typically will be on the order of 10 to 100 grams per thickness measurement. Thickness measurements with incremental weight increases are repeated until the measured thickness (t) is equal to $t_{50}$, as defined below.

Thickness (t) as a function of applied pressure (Pr) is calculated for each data point. Pr is calculated as the total weight ($W_T$) applied to the sample(s), i.e., the sum of the masses of the upper plate, spindle, and weight added to the spindle, divided by the initial sample area. The initial sample area $A_i$ is the maximum cross-sectional area of the sample(s) that would be under compression and parallel to the horizontal plane of the mounting plate upon mounting of the sample(s) determined prior to compression.

Compressive Strength (CS) is defined as the pressure at which initial sample capillary void volume (Vi) being compressed is decreased to 50% of Vi. The thickness at which this occurs ($t_{50}$) is calculated as follows:

$$t_{50} = \frac{1}{A_i} \; 0.5 \; Vi + \frac{(M/L)Z}{\rho}$$

wherein M/L=sample weight per unit length, Z=total sample length being length compressed, $\rho$ is the density of the solid polymer, and Vi is measured as the total void volume of the structure enclosed by the straight closure chords for a sample length Z (See Slenderness Ratio procedure with respect to the closure chords).

Figure 19:
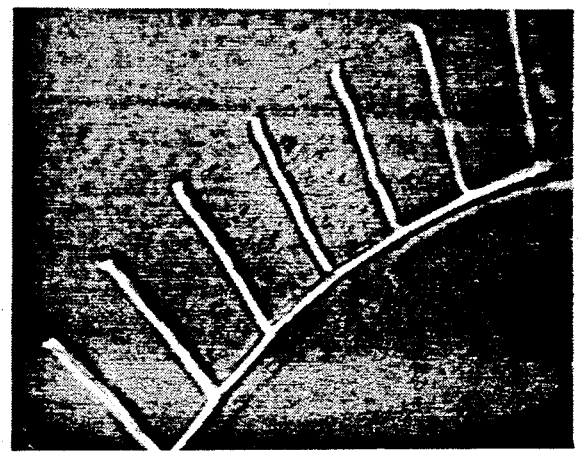
FIG. 19 is a photomicrograph (325X) of a capillary channel structure cross-section wherein the structure has a planar base and has capillary channel walls which are substantially parallel to one another and which are substantially perpendicular to the base.

As an illustration of the geometry in the compressive strength procedure, with the 2.5 cm square top plate and parallel-mounting of two samples which are laid flat, as described above, a capillary channel fiber with the 6 channels shown in FIG. 19 (325X magnification) would have $A_i$ and Z approximately as follows:

$$A_i = 2 \text{ samples} \times \frac{7 \text{ cm}}{325} \text{ wide} \times 2.5 \text{ cm long}$$

$A_i$=0.11 cm$^2$ and

Z = 2 samples × 2.5 cm long
Z = 5 cm

The other parameters for calculating $t_{50}$ (Vi, M/L, and ρ) are hereinbefore described.

This Compressive Strength procedure can be applied to wet or dry samples. To determine Wet Compressive Strengths, the sample is soaked in fluid, for 5 minutes, gently shaken, and then mounted and tested as described above.

Adhesion Tension Procedure

Adhesion Tension of the capillary channel structures is determined according to the Whilhelmy Slide Method, as applied to a smooth, rectangular strip of film prepared with the same polymer composition and surface tension-modifying treatment, if any. Determination of adhesion tension by the Whilhelmy Slide Method is known to those skilled in the art, and is described by Arthur W. Adamson in *Physical Chemistry of Surfaces*, second edition, Interscience Publishers (John Wiley & Sons, New York), 1967, at pp 26–28 and 353. For application herein, the film thickness should be about 50 microns and film width should be at least 2.0 cm.

For determining hydrophilicity of the material, distilled water is used as the test fluid. For determining oleophilicity, n-decane can be used. This procedure can also be used to determine adhesion tension with other test fluids as well.

In general, a strip of the film is vertically suspended beneath an analytical balance, such as a Mettler AE 200 (Mettler Instrument Co., Highstown, N.J.,USA), or equivalent, such that about 0.1 cm of the film is submerged in test fluid. The reservoir of test fluid should be sufficiently larger such that fluid transported up the side of the film has an insignificant effect on fluid level in the reservoir. Generally, test fluid reservoirs of about 7 ml are sufficient. Thus, the area of film initially submerged would be approximately 0.1 cm times twice the width of the film strip. After 60 seconds, the apparent weight is recorded. This procedure is repeated with new, identically prepared strips of film and fresh test fluid as appropriate to obtain statistically reliable results.

Adhesion tension ($T_{AD}$) is calculated according to the following equation:

$$T_{AD} = \frac{W_{TOT} - (W_{PLATE} - b)}{P}$$

wherein $W_{TOT}$ = apparent weight of the film after 60 sec. immersion;

$W_{PLATE}$ = initial weight of the film;

b = buoyancy correction for the immersed portion of film (b = volume of immersed portion of film times density of the fluid); and P = the perimeter of the film in contact with the test fluid.

Procedures for Slenderness Ratio, Capillary Channel Width, and Average Structure Thickness Slenderness Ratio (S), capillary channel width (CCW), and Average Structure Thickness ($t_{ave}$) are determined according to the procedures as follow. The procedures are implemented based upon a photomicrograph of a representative microtomed cross-section of the capillary channel structure, as previously described. For capillary channel structures having variation in Slenderness Ratio, capillary channel width, and Average Structure Thickness in the axial direction of the capillary channels, sufficient cross-sections should be evaluated to provide a representative weighted average Slenderness Ratio, capillary channel width, and/or average structure thickness value. If, however, any portion of this structure of linear length in the axial direction of the capillary channels of at least about 0.2 cm, preferably at least about 1.0 cm, has a Slenderness Ratio, capillary channel width, and/or average structure thickness value within the ranges hereof, then such structure may comprise a capillary channel structure of the present invention. Reference is made to FIG. 25 for exemplary purposes of the procedures.

The following equations are used:

$$S = L^2/4A_{st}$$

$$t_{ave} = 2A_{st}/L$$

wherein:

L = total solid perimeter of the cross-section of the structure; and $A_{st}$ = total area of the cross-section of the solid forming the structure perpendicular to the capillary channel axis The foregoing equation for Slenderness Ratio treats the fiber under consideration as if it has one channel-forming wall therein. For channeled fibers having a functional portion wherein one or more channels are present, the formula for Slenderness Ratio (S) can be given as:

$$S = L^2/4A_{st}N$$

wherein:

L and $A_{st}$ are as hereinbefore defined; and

N = number of channel walls in the structure, said walls being those that have, on one or both sides, channels that are closable by straight closure chords.

CCW is the length of the straight closure chord of a capillary channel wherein said chord closes said intrastructure capillary channel and which tangentially contacts the points of intersection with the capillary channel walls of said channel in such a way to maximize the volume of the channel. (Portions of the structure which do not contribute open channels closable by straight closure chords should be disregarded prior to the above calculations.)

FIG. 25 shows, for exemplary purposes, a cross-section of a capillary channel structure 900 having chords $W_1$, $W_2$, $W_3$, $W_4$, $W_5$, and $W_6$ for capillary channels $C_1$, $C_2$, $C_3$, $C_4$, $C_5$, and $C_6$, respectively, thus N=6. FIG. 25 also indicates the region corresponding to total cross-sectional area $A_{st}$ and indicates continuous line $P_L$, the length of which is the total perimeter L.

Procedures for Determining Capillary Channel Wall Parallelism and Perpendicularity A representative cross-section of a capillary channel structure is microtomed as previously described and a photomicrograph of the cross-section is prepared. Reference can be made to FIG. 26 which exemplifies various aspects of the procedure. For each capillary channel, of a capillary channel structure, a straight channel closure chord tangentially contacting the capillary channel walls of the channel is drawn to close the channel while maximizing area within the closed channel. In practice, this can be done by simply placing a straight edge of a length in excess of the widest part of the channel, tangential to the distal portion of each of the walls forming the channel. The length of the chord is determined as the minimum distance between points of intersections between the chord and each of the two walls. Line segments $LS_{x1}$, $LS_{x2}$, each having a length, equal to 75% of the length of closure chord $W_x$, are located such that the ends of such line segments $LS_{x1}$, $LS_{x2}$, contact the interior surfaces of channel walls $CW_x$, $CW_{xy}$ which serve as the boundary to the capillary channel. Similarly, the ends of line segments $LS_{y1}$, $LS_{y2}$ are 75% of the length of closure chord $W_y$ and contact the interior surfaces of channel walls $CW_y$, $CW_{xy}$, respectively. The line segments can cross the boundary of the channel walls at points intermediate to the ends of the line segments. If the line segments can be positioned such that the divergence angle between the line segments is from 0° to about 40°, the channel walls are said to be substantially parallel. It may also be preferable for the walls to be substantially perpendicular to the capillary channel closure chords. Each capillary channel wall will form the boundary of either one or two distinct open capillary channels. For example, in FIG. 26, wall $CW_x$ forms the boundary of one channel $C_x$, whereas wall $CW_{xy}$ forms the boundary of two channels $C_x$, $C_y$. When the wall serves as boundary for one channel, the wall is said to be substantially perpendicular to the closure chord if the line segment contacting the interior surface of that wall: a) can have a counterpart line segment on the opposing wall of that capillary channel wherein such line segments are substantially parallel; and b) is at an angle relative to the closure chord within 90°± about 30°, preferably ±about 15°. When the wall serves as boundary for two channels, the wall is said to be substantially perpendicular to the closure chords if the line segments contacting that wall of reach of the channels meet requirements a) and b), such that for each channel, substantially parallel line segments can be drawn wherein the line segments common to a specific wall are each substantially perpendicular to the corresponding closure chord. Perpendicularly to the plural term "closure chords" shall for convenience be interpreted to apply to situations both where perpendicularity to one or to two separate closure chords is required according to the above criteria. Also, if a specific line segment of a pair of substantially parallel line segments can be drawn at an angle of 90°+30°, preferably ±about 15°, relative to the base, the corresponding wall is said to be substantially perpendicular to the base.

As shown in FIG. 26, by capillary channel structure 1400, $LS_{x1}$ and $LS_{x2}$ are clearly substantially parallel to one another, and intersect $W_x$ (upon extension) at angles $\gamma_a$ and $\gamma_b$ which, in the figure, are about 93° and about 88°, respectively. Line segments $LS_{y1}$ and $LS_{y2}$ are also substantially parallel, and intersect chord $W_y$ at angles $\gamma_c$ and $\gamma_d$, which, in the figure, are about 91° and about 88°, respectively. Hence, walls $C_{wx}$ and $C_{wxy}$ can both be said to be substantially perpendicular to their closure chords. Referring now to FIG. 27, showing capillary channel structure 1100, having a linear wall 1110, 1110' and base 1120 cross-sectional shape, the angles $\gamma_e$, $\gamma_f$ between walls 1110, 1110' and base 1120, respectively, are about 90° and consequently are considered to meet the criteria for being substantially perpendicular to the base.

EXAMPLE I-IV

Capillary channel structures of the present invention are made by melt spinning thermoplastic polymer as described below.

The structures are made utilizing a laboratory spin line useful for melt spinning thermoplastic polymer. A suitable spin line can be obtained from Killion Extruders, Inc., West Palm Beach, Fla. The spin line includes a hopper/dryer, a one inch (2.54 cm) extruder, a metering pump assembly including two gear pump drives and an extrusion die block, three heated chimneys, one unheated air quench, one Godet, and a fiber winder.

Thermoplastic polymer resin, example Kodak PETG copolyester 6763 (Eastman Chemical Products, Inc.) is predried in a dehumidifying-type of hopper/dryer for four hours at 140° F. (60° C.). The polymer, provided in the form of pellets, is gravity dropped directly to the extruder. The extruder is a Killion one inch 24:1 L/D barrel with heat/cool control in the feed, compression, and metering zones. Temperatures is controlled in these zones by a Eurotherm type 805 controller (Eurotherm Corp., Reston, Va., USA). At the exit port of the extruder, a breaker plate retaining a screen pack is used to remove degradation products and particulate contamination introduced with the bulk polymer. The screen pack comprises a screen size configuration of mesh sizes 60, 80, 250, 300, 250, 80, and 60. After exit from the extruder, the molten polymer is pumped to the extrusion die block having a candle filter pack (20 micron pore size) and an extrusion die with an orifice design useful for making the capillary channel structures of the present invention. Heated gear pumps are used to facilitate maintenance of a steady and consistent throughput at the desired level. Polymer is pumped through the extrusion die orifice to form the undrawn capillary channel structure. Upon exiting the die, the capillary channel structure enters in sequence three independent chimney units each being zoned-heated with individual temperature controllers. The chimney units are stacked vertically beneath the extrusion die. Below the third chimney unit is an air quenched assembly unit with an adjustable flow air blower for quenching polymer temperature with unheated air. Beneath the air quench assembly is the Godet for drawing the capillary channel structures, followed by a fiber winder. The following extrusion process parameters shown below in Table I are useful for making capillary channel structures.

TABLE I

| | EXAMPLE I | EXAMPLE II | EXAMPLE III | EXAMPLE IV |
|---|---|---|---|---|
| Extrusion Die: | | | | |
| Orifice Design* | FIG. 9 | FIG. 12 | FIG. 13 | FIG. 16 |
| Wall Orifice Width (Microns) | 140 | 140 | 140 | 140 |
| Base Orifice Width (Microns) | 140 | 178 | 178 | 178 |
| Base Orifice Diameter | — | 3.8 cm | 3.8 cm | 2.5 cm |
| Wall Orifice Length | .61 cm | 1.27 cm | .74 cm | 1.18 cm** |
| Inter-Wall Orifice Distance (at base) | .20 cm | .133 cm | .066 cm/.183 cm | .25 cm |
| Angle Between Wall Orifices Adjacent to Spider | — | 18° | 20.5° | 22.5° |
| Air flow rate through Gas Inlet Port (ml/min.) | — | 9.2 | 10.0 | 9.2 |
| Polymer Temperature at Pump Outlet | 222 | 220 | 221 | 221 |

TABLE I-continued

| | EXAMPLE I | EXAMPLE II | EXAMPLE III | EXAMPLE IV |
|---|---|---|---|---|
| (°C.) | | | | |
| Polymer Flow Rate Through Pump (cc/min.) | 1.0 | 3.0 | 3.0 | 2.0 |
| Die Block Operating Pressure (MPA) | 4.07 | 4.90 | 3.03 | 2.97 |
| Die Block Temperature (°C.) | 223 | 224 | 224 | 223 |
| Chimney Temperatures (°C.)*** | | | | |
| Chimney Zone 1 | 99 | 122 | 127 | 135 |
| Chimney Zone 2 | 69 | 93 | 93 | 93 |
| Chimney Zone 3 | Ambient | 93 | 93 | 93 |
| Air Quench Temperature (°C.) | 20 | 19 | 20 | 20 |
| Draw Ratio | 3040 | 5875 | 5100 | 5124 |
| Denier | 60 | 199 | 223 | 200 |

*Refers to the general design of the extrusion die orifice.
**Includes length of both orifice extensions.
***Chimney zone temperatures represent temperature of the interior surface of the chimney.

What is claimed is:

1. An extrusion process for making structures with a plurality of substantially parallel capillary channels, said process comprising the steps of:
   (a) feeding a flowable, molten polymer composition through an extrusion die wherein the extrusion die has an annular base orifice from which a plurality of capillary channel wall orifices radially extend, such that the polymer composition upon exiting said extrusion die comprises a hollow annular base and a plurality of capillary channel walls extending radially from said base, said base and walls forming a plurality of capillary channels, and wherein said extrusion die has a gas inlet port located interior to said annular base orifice;
   (b) simultaneously with feeding said polymer composition through said extrusion die's annular base and capillary channel wall orifices, directing a gaseous stream through said gas inlet port in the same direction as the flow of said molten polymer composition; and
   (c) subsequent to exit of the polymer composition from the extrusion die, drawing the capillary channel structure to a desired size and cooling said structure.

2. A process according to claim 1 wherein said polymer composition comprises a thermoplastic polymer and a hydrophilizing agent.

3. A process according to claim 1 wherein, upon exit of the polymer composition from the extrusion die, said polymer composition is cooled in a cooling zone having an ambient temperature of at least about 28° C. below the temperature of the polymer composition as it enters said cooling zone.

4. An extrusion die, said die comprising a capillary channel orifice layer, said layer having an annular base orifice from which a plurality of capillary channel wall orifices radially extend, said capillary channel orifice layer further having an interior region and an exterior region relative to said annular base orifice, a gas inlet port disposed within the interior region of said annular base orifice, and means for fixably maintaining said interior region in place, relative to said exterior region.

* * * * *